(12) United States Patent
Liu et al.

(10) Patent No.: US 9,097,443 B2
(45) Date of Patent: Aug. 4, 2015

(54) SOLAR PANEL ROOFTOP MOUNTING AND GROUNDING DEVICE

(71) Applicant: Sunmodo Corporation, Vancouver, WA (US)

(72) Inventors: Jun Liu, Camas, WA (US); Clifford Schrock, Portland, OR (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 14/520,113

(22) Filed: Oct. 21, 2014

(65) Prior Publication Data

US 2015/0101997 A1    Apr. 16, 2015

Related U.S. Application Data

(63) Continuation-in-part of application No. 14/054,759, filed on Oct. 15, 2013.

(51) Int. Cl.
*E04D 13/18* (2014.01)
*F24J 2/52* (2006.01)
*H02S 20/23* (2014.01)

(52) U.S. Cl.
CPC ............. *F24J 2/5258* (2013.01); *F24J 2/5205* (2013.01); *F24J 2/5228* (2013.01); *F24J 2/5245* (2013.01); *H02S 20/23* (2014.12)

(58) Field of Classification Search
CPC . H01L 31/0422; H01L 31/0508; H02S 20/00; E04D 1/34; F16B 2/065; F16B 5/0685; F16B 33/006; F16B 5/0635; F16B 37/045; F16B 5/0208; F16B 19/1081; F24J 2/5258; F24J 2/5228; F24J 2/5205
USPC .................................................. 52/710, 711
See application file for complete search history.

(56) References Cited

U.S. PATENT DOCUMENTS

| | | | | |
|---|---|---|---|---|
| 2,828,931 | A | * | 4/1958 | Harvey ........................... 410/46 |
| 3,603,622 | A | * | 9/1971 | March ............................ 52/92.2 |
| 4,270,681 | A | * | 6/1981 | Ingram .......................... 224/321 |

(Continued)

FOREIGN PATENT DOCUMENTS

| | | |
|---|---|---|
| AU | 2010200545 A1 | 2/2010 |
| CA | 2486445 A1 | 11/2003 |

(Continued)

OTHER PUBLICATIONS

Ironridge Parts Catalog Winter/Spring 2012, Nov. 2012, pp. 8 & 14, Ironridge, Willits, CA US.

(Continued)

*Primary Examiner* — Brian Glessner
*Assistant Examiner* — Gisele Ford
(74) *Attorney, Agent, or Firm* — Stone Creek Services LLC; Alan M. Flum

(57) ABSTRACT

Disclosed is a device for securing, mounting, aligning, and grounding solar panels to a roof mounted rail. The device in combination with a t-bolt, a nut, and a solar panel end-clamp or mid-clamp, secure, mount, align, and ground the solar panels to the roof mounted rail. The device can be inserted into the top of the rail anywhere along its length. After the device and t-bolt are inserted in the rail, the t-bolt rotated so it inserts into a slot at the bottom of the rail thereby securing the device to the rail, assuring the proper orientation of the t-bolt, and preventing further rotation of the t-bolt.

10 Claims, 15 Drawing Sheets

(56) References Cited

U.S. PATENT DOCUMENTS

| | | | |
|---|---|---|---|
| 5,269,784 A * | 12/1993 | Mast | 606/288 |
| 5,779,412 A * | 7/1998 | Nagai et al. | 411/85 |
| 6,360,491 B1 | 3/2002 | Ullman | |
| 7,241,094 B1 * | 7/2007 | Potts et al. | 411/85 |
| 7,634,875 B2 * | 12/2009 | Genschorek | 52/173.3 |
| 7,748,175 B2 * | 7/2010 | Liebendorfer | 52/173.3 |
| 7,762,027 B1 * | 7/2010 | Wentworth et al. | 52/173.3 |
| 8,092,129 B2 | 1/2012 | Wiley et al. | |
| 8,256,170 B2 * | 9/2012 | Plaisted et al. | 52/173.3 |
| 8,464,478 B2 * | 6/2013 | Tweedie | 52/173.3 |
| 8,495,839 B2 * | 7/2013 | Tsuzuki et al. | 52/173.3 |
| 8,505,864 B1 * | 8/2013 | Taylor et al. | 248/237 |
| 8,647,009 B2 * | 2/2014 | Kobayashi | 403/7 |
| 8,661,747 B2 * | 3/2014 | Eide | 52/173.3 |
| 2002/0078657 A1 * | 6/2002 | Zambelli et al. | 52/710 |
| 2004/0025459 A1 * | 2/2004 | Huebner et al. | 52/282.1 |
| 2007/0212935 A1 * | 9/2007 | Lenox | 439/567 |
| 2007/0295391 A1 | 12/2007 | Lenox et al. | |
| 2008/0302928 A1 * | 12/2008 | Haddock | 248/205.1 |
| 2009/0000220 A1 * | 1/2009 | Lenox | 52/173.1 |
| 2009/0200443 A1 * | 8/2009 | Burtscher et al. | 248/316.1 |
| 2009/0230257 A1 * | 9/2009 | Reyen et al. | 248/74.2 |
| 2010/0102011 A1 * | 4/2010 | Blum | 211/8 |
| 2010/0269447 A1 * | 10/2010 | Schuit et al. | 52/698 |
| 2010/0276558 A1 | 11/2010 | Faust et al. | |
| 2011/0100434 A1 | 5/2011 | Van Walraven | |
| 2011/0138585 A1 * | 6/2011 | Kmita et al. | 24/522 |
| 2011/0179727 A1 * | 7/2011 | Liu | 52/173.3 |
| 2011/0209745 A1 * | 9/2011 | Korman et al. | 136/251 |
| 2011/0214365 A1 | 9/2011 | Aftanas | |
| 2011/0214367 A1 * | 9/2011 | Haddock et al. | 52/173.3 |
| 2011/0299957 A1 | 12/2011 | Young | |
| 2012/0073220 A1 | 3/2012 | Kobayashi et al. | |
| 2012/0090666 A1 * | 4/2012 | Rowe | 136/251 |
| 2012/0097207 A1 * | 4/2012 | Shufflebotham et al. | 136/244 |
| 2012/0097807 A1 | 4/2012 | Rees | |
| 2012/0102853 A1 * | 5/2012 | Rizzo | 52/173.3 |
| 2012/0152326 A1 | 6/2012 | West et al. | |
| 2012/0175322 A1 * | 7/2012 | Park et al. | 211/41.1 |
| 2012/0175479 A1 | 7/2012 | Graham et al. | |
| 2012/0199181 A1 | 8/2012 | Newman et al. | |
| 2012/0233958 A1 * | 9/2012 | Stearns | 52/708 |
| 2012/0244729 A1 | 9/2012 | Rivera et al. | |
| 2012/0248271 A1 * | 10/2012 | Zeilenga | 248/231.41 |
| 2012/0255675 A1 * | 10/2012 | Sha et al. | 156/281 |
| 2012/0267490 A1 | 10/2012 | Haddock et al. | |
| 2012/0298817 A1 | 11/2012 | West et al. | |
| 2012/0304556 A1 * | 12/2012 | Teller et al. | 52/173.1 |
| 2013/0055662 A1 * | 3/2013 | Gilles-Gagnon et al. | 52/173.3 |
| 2013/0091786 A1 * | 4/2013 | DuPont et al. | 52/173.3 |
| 2013/0192150 A1 * | 8/2013 | DuPont et al. | 52/173.3 |
| 2013/0200245 A1 * | 8/2013 | Markiewicz et al. | 248/500 |
| 2013/0248668 A1 * | 9/2013 | Lu et al. | 248/222.14 |
| 2013/0340358 A1 * | 12/2013 | Danning | 52/126.7 |
| 2013/0340810 A1 * | 12/2013 | Danning | 136/251 |
| 2014/0010616 A1 * | 1/2014 | Meine et al. | 411/190 |
| 2014/0102996 A1 * | 4/2014 | Pelman | 211/41.1 |

FOREIGN PATENT DOCUMENTS

| | | |
|---|---|---|
| CN | 201378595 Y | 1/2010 |
| CN | 202076285 U | 12/2011 |
| DE | 202007016861 U1 | 6/2008 |
| EP | 2292988 A2 | 3/2011 |
| JP | 201126895 A | 12/2011 |
| WO | 2012121147 A1 | 9/2012 |
| WO | 2013119218 A1 | 8/2013 |

OTHER PUBLICATIONS

Tough Trac Pitch Roof Set Installation Manual 2011, Sep. 15, 2011, pp. 2 & 11, Tough Trac, St. Louis, MI US.

Tough Trac Pitch Roof System 2013, Nov. 8, 2012, p. 2, Tough Trac, St. Louis, MI US.

Frontierack FRO-100 Tile Rooftop Mounting System Customer Operation Manual, May 17, 2011, pp. 5, 9-11, Frontier Technology Group Ltd., Shanghai, CN.

Frontierack FRO-100 Pitch Tin Rooftop System Customer Operation Manual, May 17, 2011, pp. 5-10, Frontier Technology Group Ltd., Shanghai, CN.

Sunmodo End Clamp Kit for Light Rail 4 Pack, accessed on Internet: http://sunmodo.mybigcommerce.com/end-clamp-kit-for-light-rail-4-pack/ on Dec. 1, 2012.

Wiley Electronics LLC Washer, Electrical Equipment Bond (WEEB) Installation Instructions for Sunmodo EZ Helio System Only, Jul. 30, 2010, pp. 1, & 5-7 Wiley Electronics LLC.

Mounting Unirac Grounding Clips and WEEBLugs Installation Sheet 225.5, Feb. 2009, p. 1., Unirac, Albuquerque, NM, US.

Sunmodo End Clamp Kit for Light Rail 4 Pack, accessed on the Internet: http://sunmodo.mybigcommerce.com/mid-clamp-kit-4-pack/ on Dec. 1, 2012.

Rooftop Installation Manual, May 23, 2011, p. 4, Dan-solar EU, accessed on the Internet: http://dansolar.eu/montage_uk.pdf.

SolarMount Code-Complaint Instruction Manual 227, Mar. 3, 2008, pp. 14-15, 20, & 25, Unirac, Albuquerque, NM.

Fastrack PV Rail System, Dec. 3, 2010, Home Energy Solutions, Ltd., Barrie, ON, CA.

Wiley Electronics LLC, Washer, Electrical Equipment Bonding (WEEB), Oct. 29, 2010, Home Energy Solutions, Ltd., Barrie, ON, CA.

Installation Detail SolarMount Rail Top Mounting Clamp Universal Grounding Clips, Aug. 22, 2008, Unirac, Albuquerque, NM US.

T6 Pitched Roof PV Rail System, May 13, 2011, Applied Energy Technology, Clinton Township, MI US.

T6 Flush Mount Installation Guide, Mar. 4, 2011, pp. 2, 5-7, Applied Energy Technology, Clinton Township, MI US.

Burndy Washer, Electrical Equipment Bond, WEEB Installation Instructions for K2 Systems Only, Sep. 6, 2012, Document No. 104-0404-000031-003, Burndy LLC, Londonderry, NH.

Burndy Washer, Electrical Equipment Bond, WEEB Installation Instructions for DP&W Power Rail P6 and P8 Systems Only, Sep. 6, 2012, Document No. 104-0404-000045-003, Burndy LLC, Londonderry, NH.

Burndy Washer, Electrical Equipment Bond, WEEB Installation Instructions for Clenergy PV-ezRack SolarRoof only, Sep. 12, 2012, Document No. 104-0404-000065-003, Burndy LLC, Londonderry, NH.

U.S. Appl. No. 13/907,548, Inventor: Jun Liu, "Direct Rooftop Mounting Apparatus for Solar Panels," filed May 31, 2013 (Unpublished), United States Patent and Trademark Office, Alexandria, VA.

Non-Final Office Action, U.S. Appl. No. 13/907,548, Inventor: Jun Liu, "Direct Rooftop Mounting Apparatus for Solar Panels," Date of Office Action: Dec. 13, 2013, Application Filing Date: May 31, 2013 (Unpublished), United States Patent and Trademark Office, Alexandria, VA.

Final Office Action, U.S. Appl. No. 13/907,548, Inventor: Jun Liu, "Direct Rooftop Mounting Apparatus for Solar Panels," Date of Office Action: Mar. 31, 2014, Application Filing Date: May 31, 2013 (Unpublished), United States Patent and Trademark Office, Alexandria, VA.

Non-Final Office Action, U.S. Appl. No. 13/907,548, Inventor: Jun Liu, "Direct Rooftop Mounting Apparatus for Solar Panels," Date of Office Action: Jul. 17, 2014, Application Filing Date: May 31, 2013 (Unpublished), United States Patent and Trademark Office, Alexandria, VA.

Muhammad Ijaz, Non Final Office Action, U.S. Appl. No. 14/054,759, filed Oct. 15, 2013, Inventor: Jun Liu, Date of Office Action: Jun. 17, 2014, United States Patent and Trademark Office, Alexandria, VA.

Mark Stephens, Office Action CA 2,868,357, "Solar Panel Rooftop Mounting and Grounding Device," Owner: Sunmodo Corporation, Inventor: Jun Liu, Date of Office Action: Apr. 10, 2015.

* cited by examiner

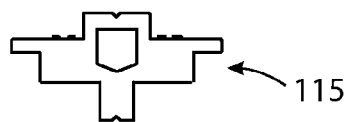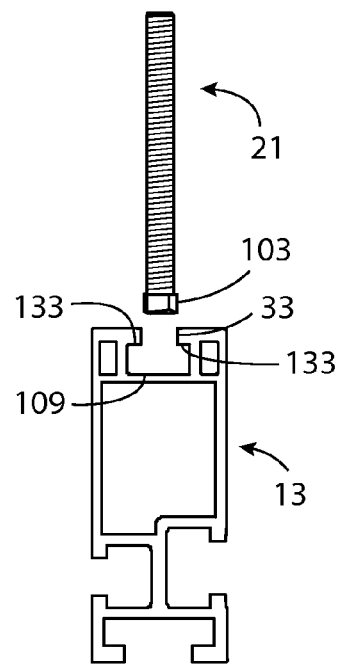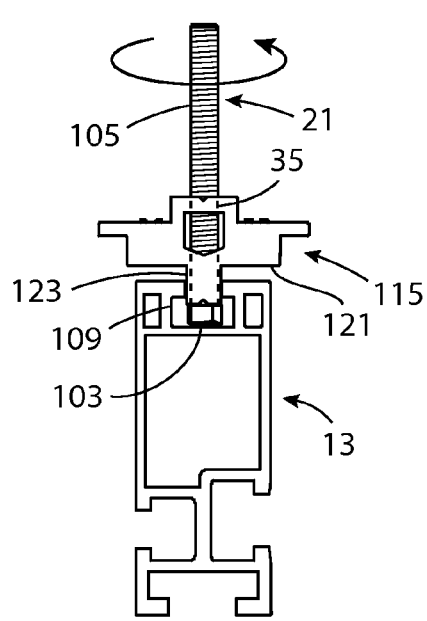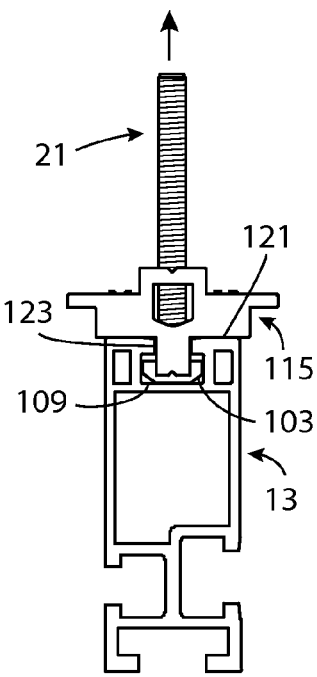
FIG. 24  FIG. 25  FIG. 26

SOLAR PANEL ROOFTOP MOUNTING AND GROUNDING DEVICE

CROSS-REFERENCE TO RELATED APPLICATIONS

This application is a continuation-in-part of U.S. patent application Ser. No. 14/054,759 filed on Oct. 15, 2013. The entire contents of U.S. patent application Ser. No. 14/054,759 are hereby incorporated by reference.

BACKGROUND

The present disclosure relates to a device for mounting solar panels. In particular, the present disclosure relates to a device for mounting solar panels, such as solar photovoltaic (PV) or solar thermal panels, to rooftop mounted rails.

Solar panels can be mounted to various types of roof structures, such as pitched shingle, tile, metal, or concrete roofs with rails. For pitched roofs that are rectangular shaped, the rails are often mounted along the length of the roof. The solar panels are generally mounted to the rails along an edge perpendicular to the rails. In addition, it is desirable, and often required by local building codes, to electrically ground the solar panels to the rails.

Aligning and mounting the solar panels to the rails and then assuring that they are properly grounded can often be labor intensive and time consuming. It is therefore desirable for a device that secures, aligns, and grounds the solar panels to the rails that is simple and efficient.

SUMMARY

Disclosed is a device for securing, aligning, and grounding solar panels to roof mounted mounting rails that overcomes one or more of the challenges presented in the Background Section. The device in combination with a t-bolt, a nut or a hollow bolt, and a solar panel end-clamp or mid-clamp, now secure, mount, align, and ground the solar panels to each other and to the roof mounted rail. The device can be inserted into the top of the rail anywhere along its length. After the device and t-bolt are inserted in the rail, the t-bolt is rotated so it inserts into a slot at the bottom of the rail thereby securing the device to the rail and preventing further rotation of the t-bolt.

In one aspect of the present disclosure, an apparatus for mounting a solar panel to a rail includes a t-bolt in conjunction with a mounting device. The mounting device includes a base portion and an alignment portion. The alignment portion projects upward from the base portion. The alignment portion is configured to align at least one side of a solar panel perpendicular to the rail. Grounding pins go through both the top and bottom surface of the base portion, the grounding pins have conical or pointed tips on either end to penetrate the non-conductive oxide layer of the solar panels frames and the mounting rail. When the solar panels are secured to the mounting device base portion on either side of the alignment portion, they are electrically bonded to each other as well as the mounting rail. The apparatus can be configured so that when t-bolt is engaged in a slot in the base portion, and the base portion and t-bolt in combination are both engaged within a slot at the top of the rail, the top surface of the base portion will be parallel with and positioned at or below the top surface of the rail slot. This provides a stable seating surface for the solar panels. In addition, the alignment portion bottom surface will include portions resting against the rail top surface on opposing sides of the rail slot. This arrangement adds stability to the apparatus. The t-bolt is vertically captive within the rail slot and rotatively captive within the base portion slot. This arrangement allows an installer to secure the solar panel to the t-bolt with only a solar panel clamp and a single mounting nut.

In another aspect of the present disclosure, an apparatus for mounting a solar panel to a rail the apparatus includes a t-bolt and a mounting device. The mounting device includes a base portion and an alignment portion that projects upward from the base portion. The base portion and alignment portion are integrally joined and can be integrally formed. The base portion includes a pair of opposing and parallel sides. The bottom surface of the base portion includes a transverse slot. The slot is wider than the width of the t-bolt head and narrower than the t-bolt head length. The alignment, portion a pair of opposing sides that are parallel to each other. The pair of opposing parallel sides project perpendicularly upward from the base portion and are oriented perpendicularly transverse with respect to the base portion sides. The alignment portion is positioned with respect to the base portion so that a top surface of the base portion presents a planar top surface on the opposing parallel sides of the alignment portion. The alignment portion also includes an aperture aligned over the base portion slot for pass through a portion of the t-bolt.

In another aspect of the disclosure, an apparatus for mounting solar panels to rails is disclosed that allows the solar panels to be mounted parallel to the rails instead of perpendicular to the rails. The apparatus includes a t-bolt and a mounting device. The mounting device includes a planar top surface, a planar bottom surface, a first portion with parallel sides projecting vertically from the planar top surface, and a second portion with parallel sides projecting vertically downward from the planar bottom surface. The second portion includes a slot running transversely across it and an aperture that passes through the slot and through the planar top surface. The t-bolt and the mounting device are configurable into a position where the t-bolt body passes through the aperture, the t-bolt head planar bottom surface engages flushly against the slot, and the t-bolt is rotationally captive within the slot.

In a further aspect of the disclosure, an apparatus for mounting solar panels parallel to the rail includes a t-bolt, a rail, and a mounting device. The mounting device includes a planar top surface, a planar bottom surface, a first portion with parallel sides projecting vertically for the planar top surface, and a second portion with parallel sides projecting vertically downward from the planar bottom surface. The second portion includes a slot running transversely across it and an aperture that passes through the slot and through the planar top surface. The t-bolt, the mounting device, and the rail can be configured into a position where the t-bolt is received by an aperture and vertically and rotational captive within the second portion slot, the t-bolt head planar bottom surface engages flush against the rail slot cavity, the second portion fully within the rail slot and the rail slot cavity, and the planar bottom surface of the mounting device engages flush against the rail.

This Summary has introduced a selection of concepts in simplified form that are described in greater detail in the Description. The Summary's purpose is to aid in understanding the Description. It is not intended to identify essential features or limit the scope of the claimed subject matter.

DRAWINGS

Figure 11:
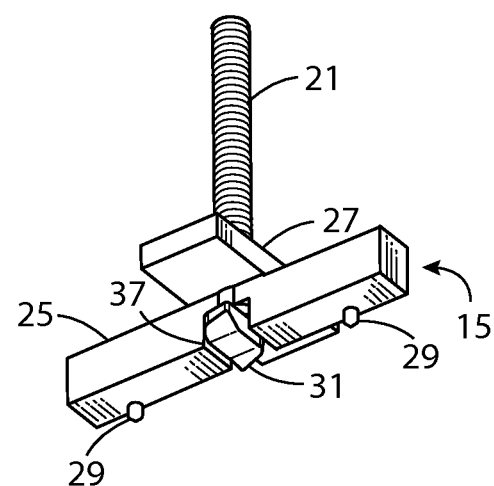

FIG. 11 shows a bottom perspective view of the t-bolt 21 inserted into the mounting device 15 illustrated the relationship between the t-bolt 21 and the mounting device 15 when they are secured to the mounting rail.

Figure 12:
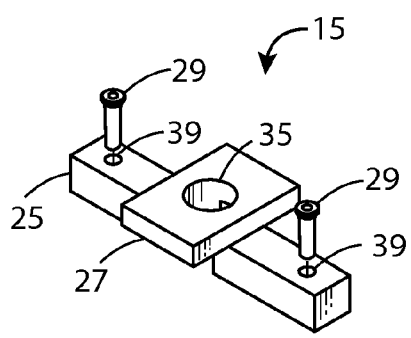

FIG. 12 shows an exploded perspective view of the mounting device and the grounding pins.

Figure 13:
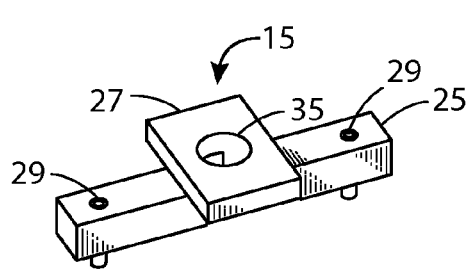

FIG. 13 shows an exploded perspective view of the mounting device with the grounding pins secured in the base portion.

Figure 14:
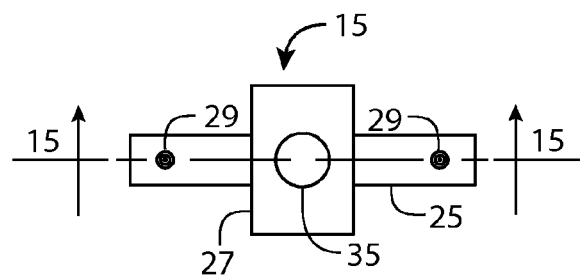

FIG. 14 shows a top view of the mounting device.

Figure 15:
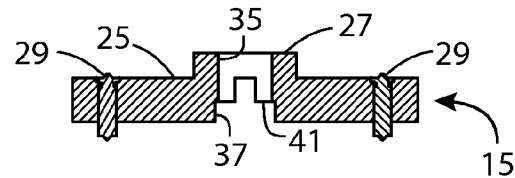

FIG. 15 shows a sectional view of the mounting device of FIG. 14 taken along section lines 15-15.

Figure 16:
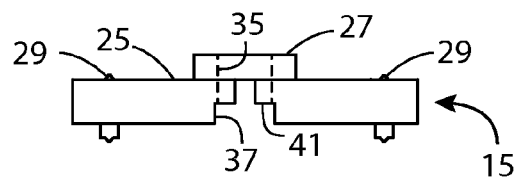

FIG. 16 shows a side view of the mounting device.

Figure 17:
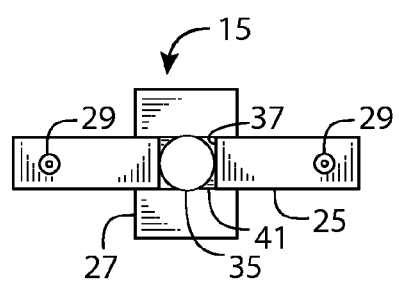

FIG. 17 shows a bottom view of the mounting device.

Figure 18:
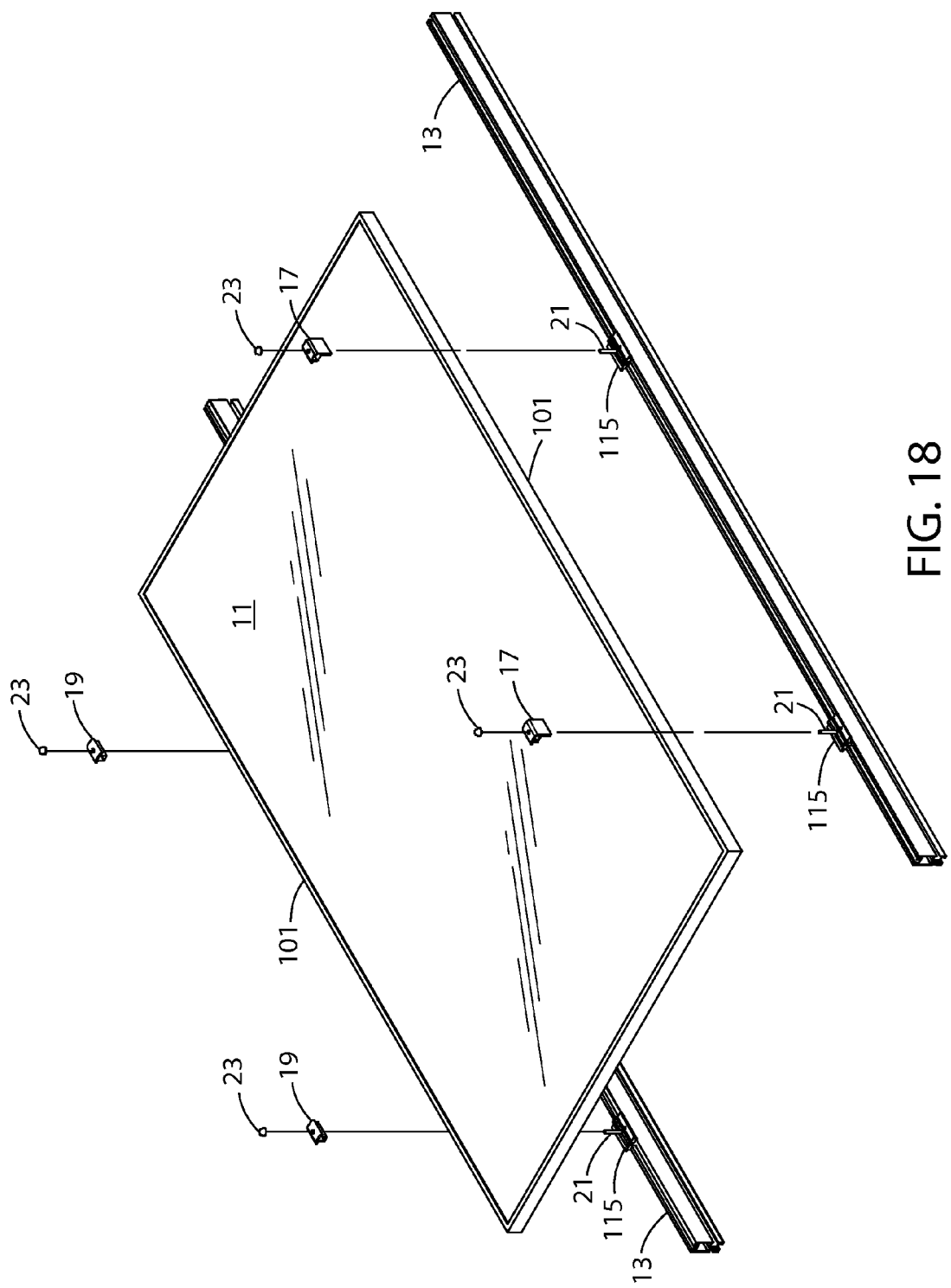

FIG. 18 shows a shows solar panels, a rail, and a device for mounting, aligning, and grounding the solar panels to the rail, in partially exploded perspective view.

Figure 19:
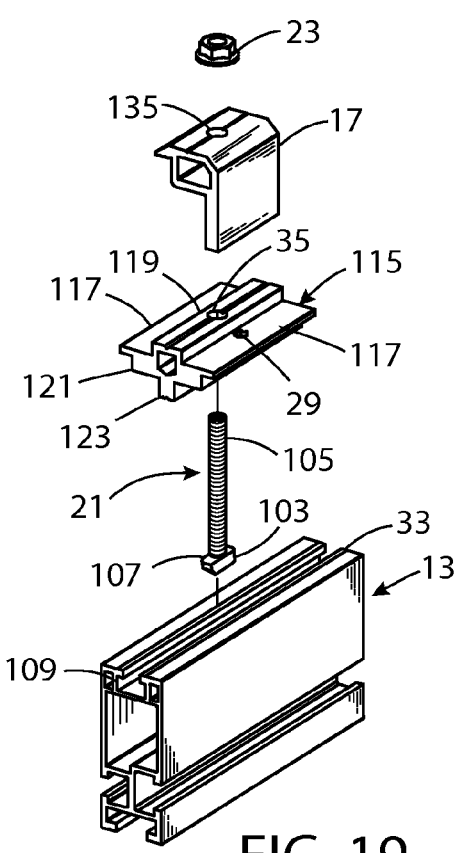

FIG. 19 shows, in exploded perspective view, the mounting device with the solar panel end-clamp, t-bolt, nut, and rail.

Figure 20:
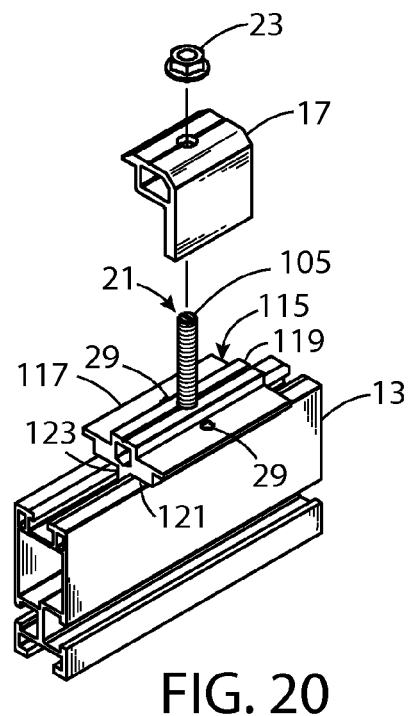

FIG. 20 shows, in partially exploded perspective view, the mounting device seated in the rail with solar panel end-clamp and nut exploded away from the mounting device rail assembly.

Figure 21:
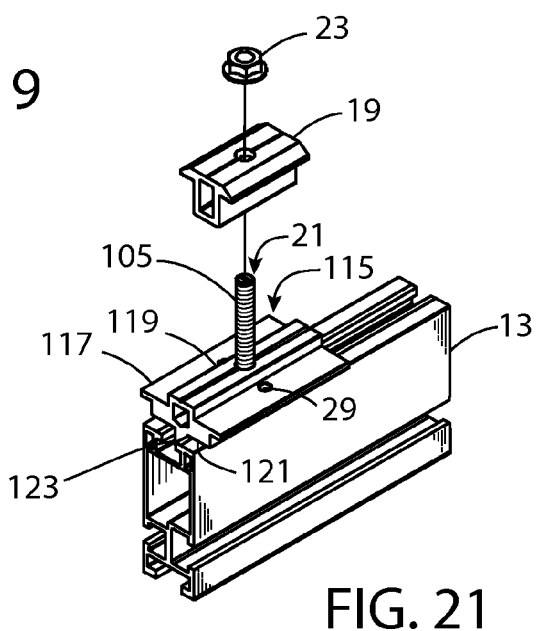

FIG. 21 shows, in partially exploded perspective view, the mounting device seated in the rail with a solar panel mid-clamp and nut exploded away from the mounting device rail assembly.

Figure 22:
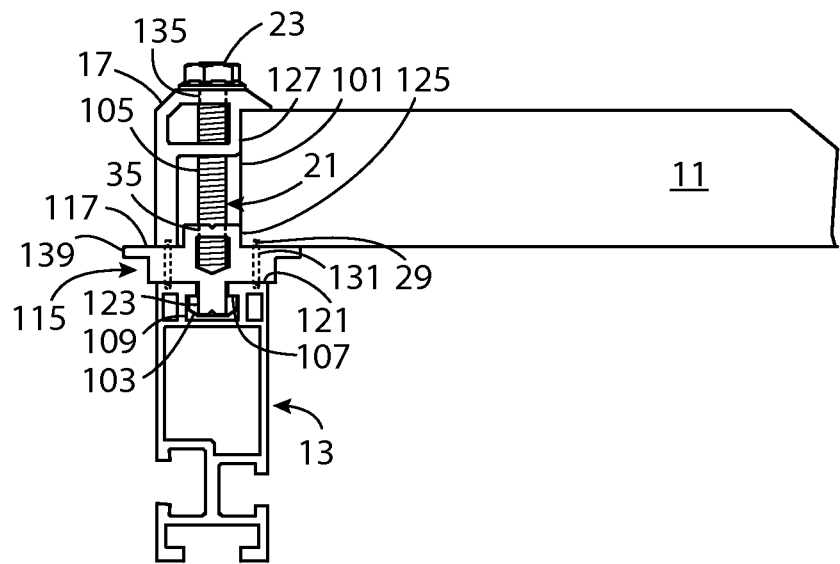

FIG. 22 shows, in side view, the mounting device, solar panel, and solar panel end-clamp secured to the rail.

Figure 23:
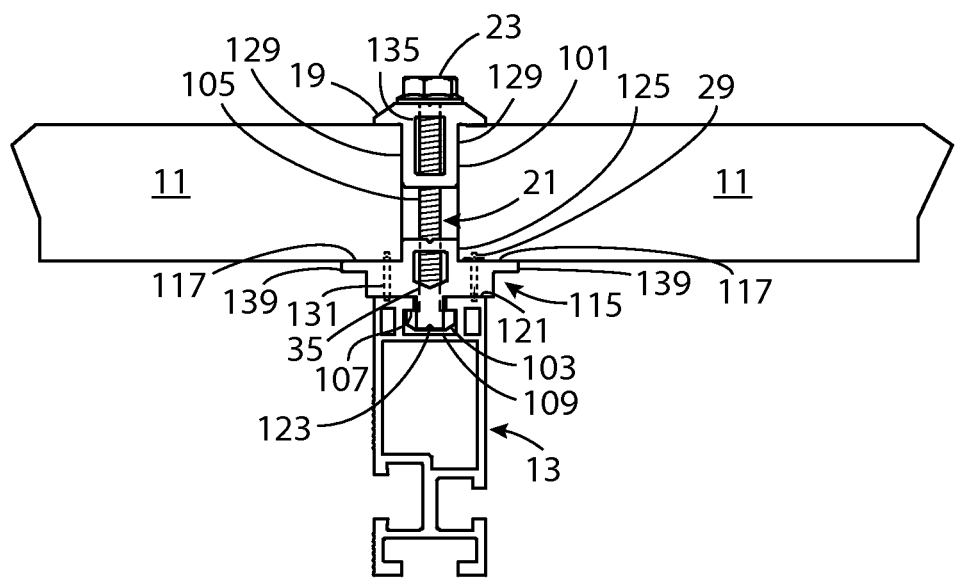

FIG. 23 shows, in side view, the mounting device, solar panels, and solar panel mid-clamp secured to the rail.

FIG. 24 shows, in side view, a first step in the assembly sequence of securing the mounting device and t-bolt to the rail.

FIG. 25 shows, in side view, a second step in the assembly sequence of securing the mounting device and t-bolt to the rail.

FIG. 26 shows, in side view, a third step in the assembly sequence of securing the mounting device and t-bolt to the rail.

Figure 27:
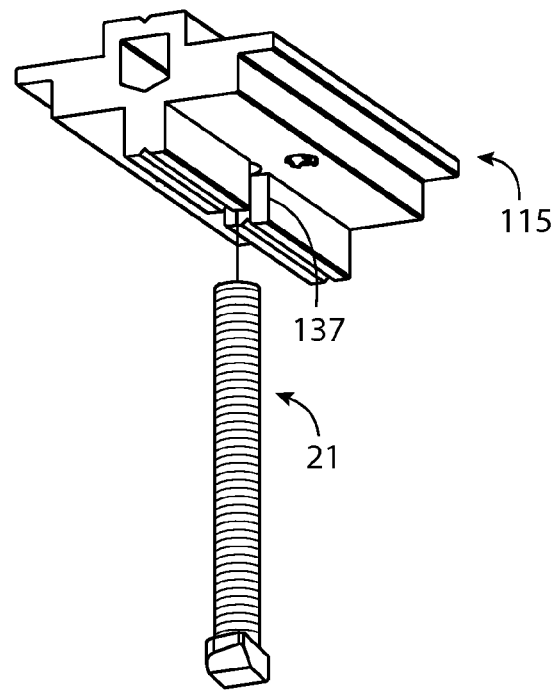

FIG. 27 shows, in bottom perspective exploded view, the t-bolt and the mounting device.

Figures 28, 29:
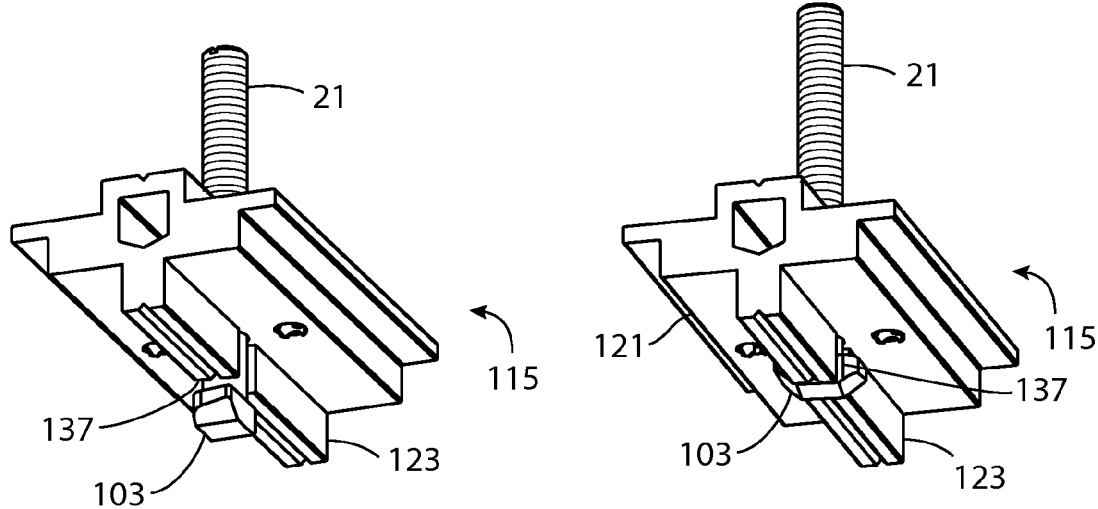

FIG. 28 shows in bottom perspective view, the t-bolt and the mounting device where the t-bolt is positioned in the non-engaged position, like in FIG. 25.

FIG. 29 shows in bottom perspective view, the t-bolt and the mounting device where the t-bolt is positioned in the engaged or locked position, like in FIG. 26.

Figures 30, 31:
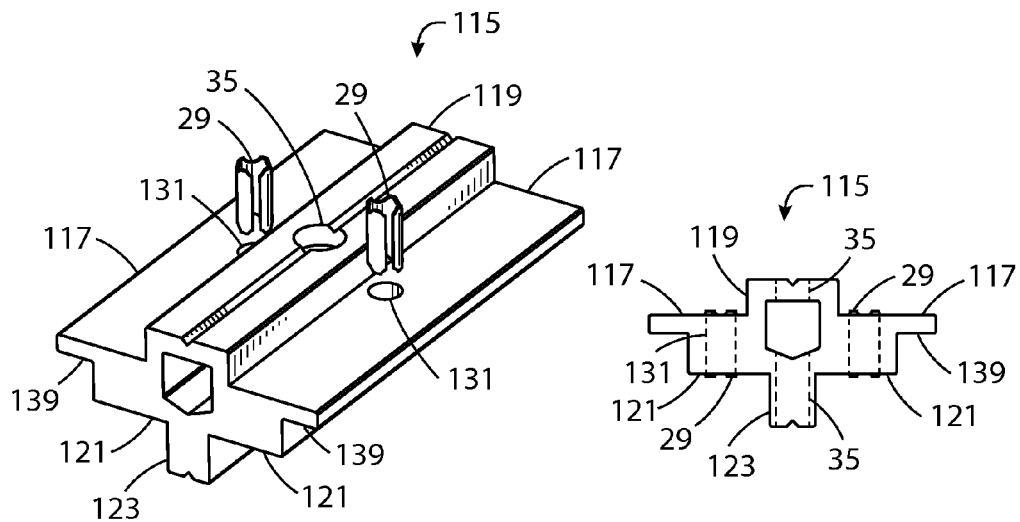

FIG. 30 shows a top perspective view of the mounting device with the grounding pins exploded away.

FIG. 31 shows a side view of the mounting device.

Figures 32, 33:
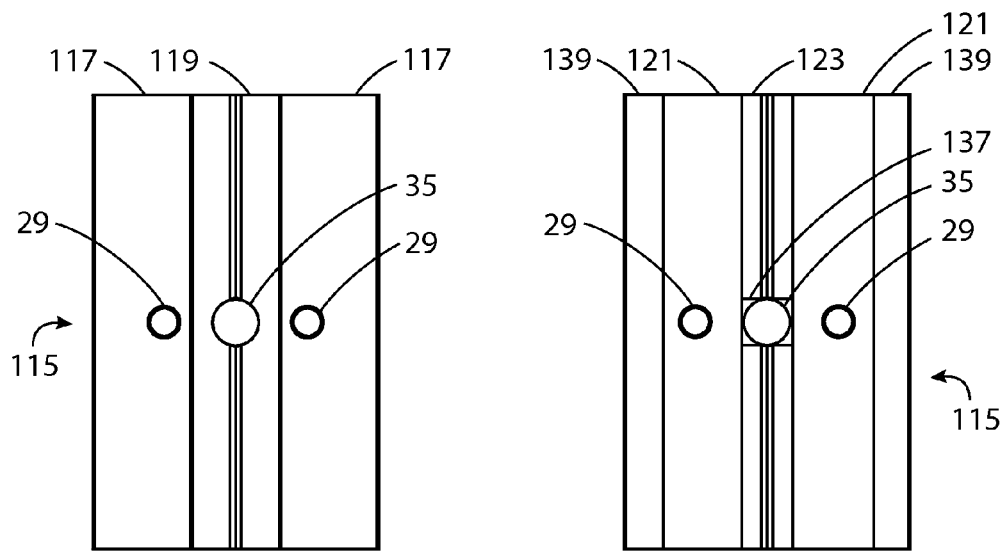

FIG. 32 shows a top view of the mounting device.

FIG. 33 shows a bottom view of the mounting device.

Figure 34:
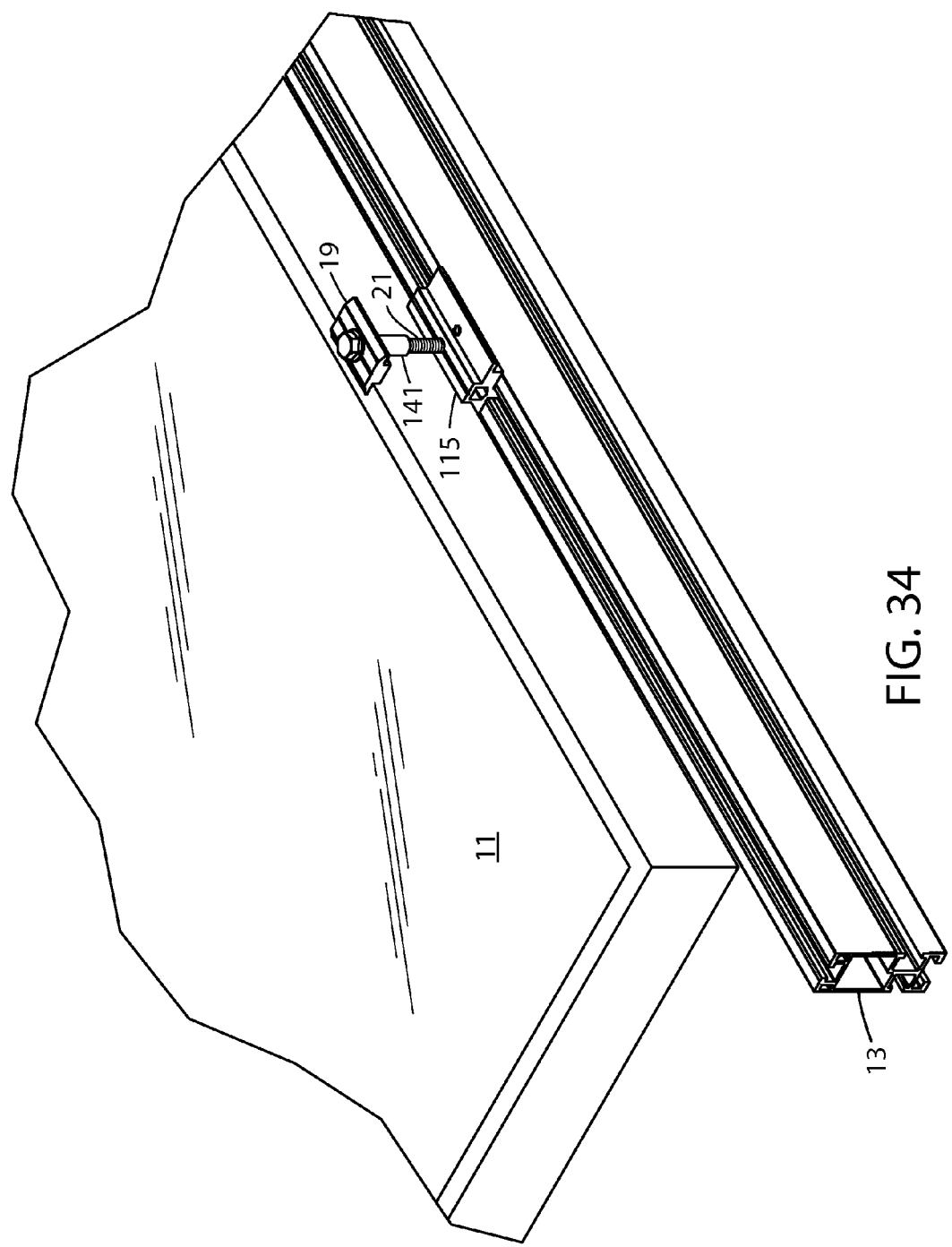

FIG. 34 shows the solar panel secured to the rail by the mounting device, solar panel mid-clamp, t-bolt, and hollow bolt.

Figure 35:
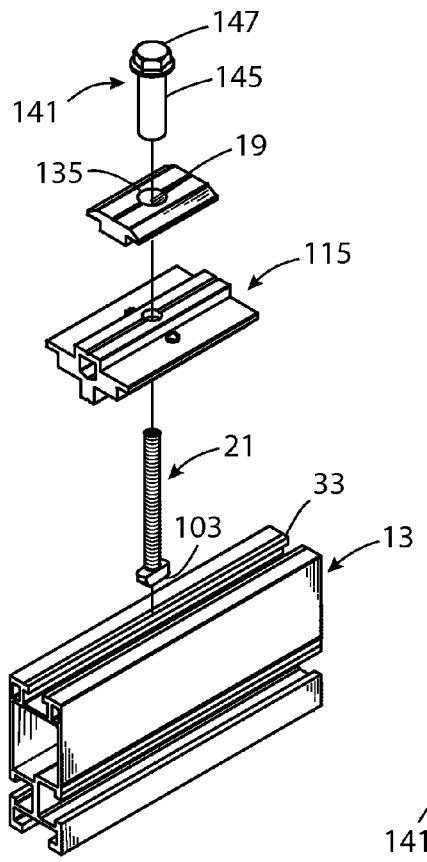

FIG. 35 shows, in exploded perspective view, the mounting device with the solar panel mid-clamp, t-bolt, hollow bolt, and rail.

Figure 36:
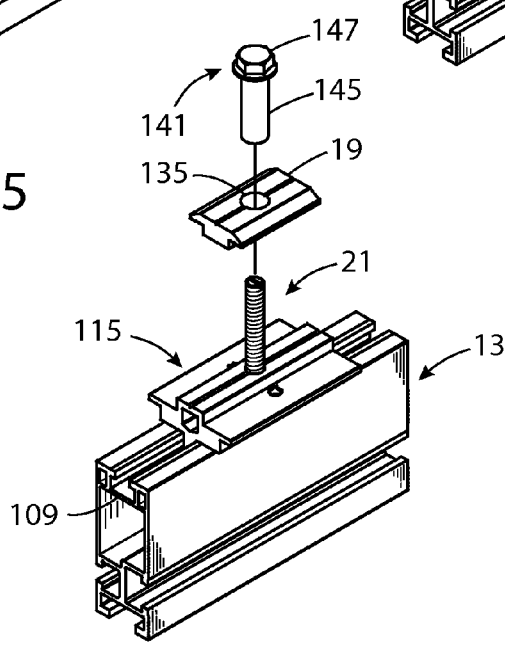

FIG. 36 shows, in partially exploded perspective view, the mounting device seated in the rail with solar panel mid-clamp and hollow bolt exploded away from the mounting device rail assembly.

Figure 37:
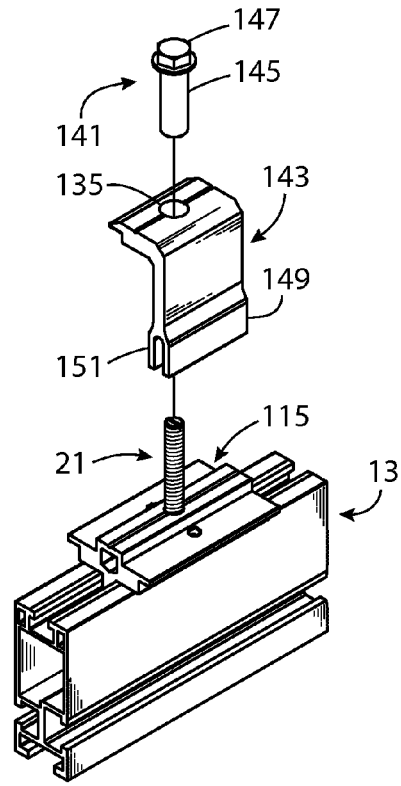

FIG. 37 shows, in partially exploded perspective view, the mounting device seated in the rail with a solar panel end-clamp and hollow bolt exploded away from the mounting device rail assembly.

Figure 38:
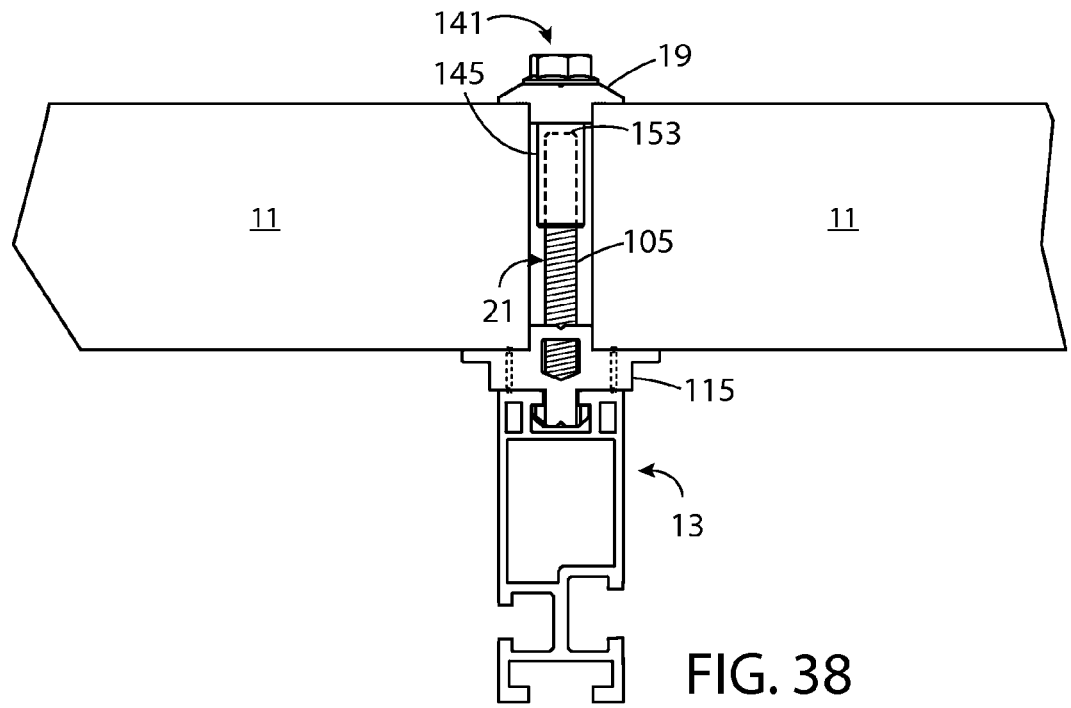

FIG. 38 shows, in side view, the mounting device, solar panel, and solar panel mid-clamp, and hollow bolt secured to the rail.

Figure 39:
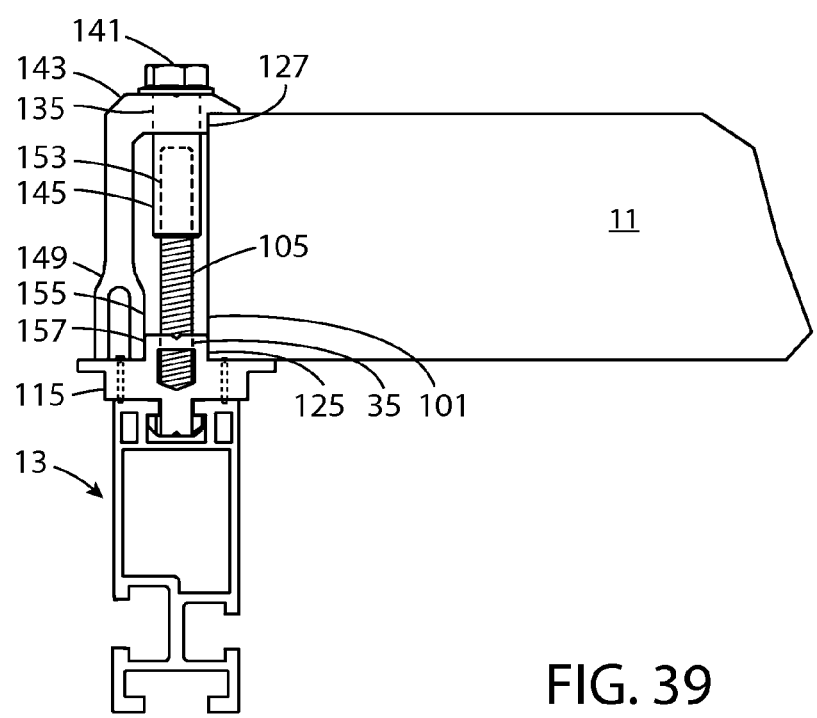

FIG. 39 shows, in side view, the mounting device, solar panel, and solar panel end-clamp, and hollow bolt secured to the rail.

Figure 40:
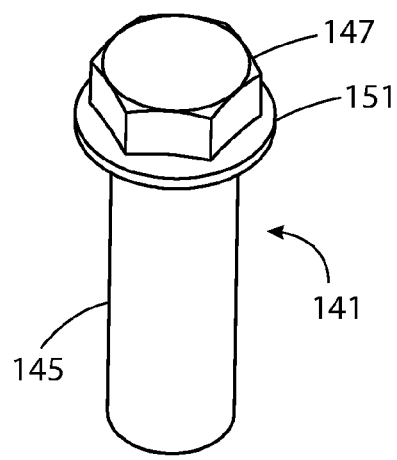

FIG. 40 shows a top perspective view of the hollow bolt.

Figure 41:
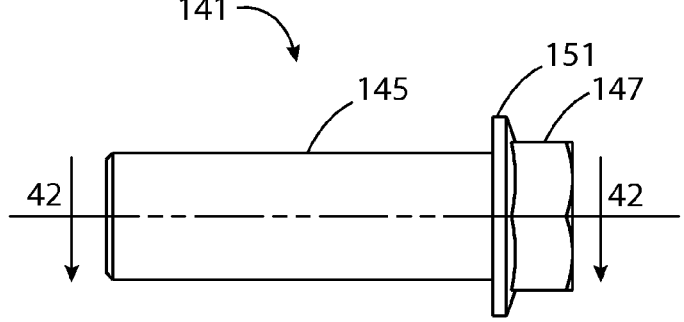

FIG. 41 shows a side view of the hollow bolt.

Figure 42:
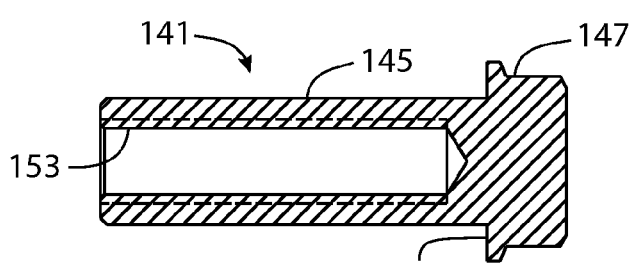

FIG. 42 shows a sectional view of the hollow bolt taken along section lines 42-42 in FIG. 41.

Figure 43:
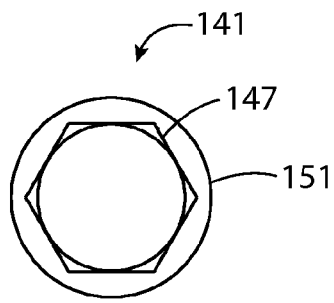

FIG. 43 shows a top view of the hollow bolt.

DESCRIPTION

Figure 1:
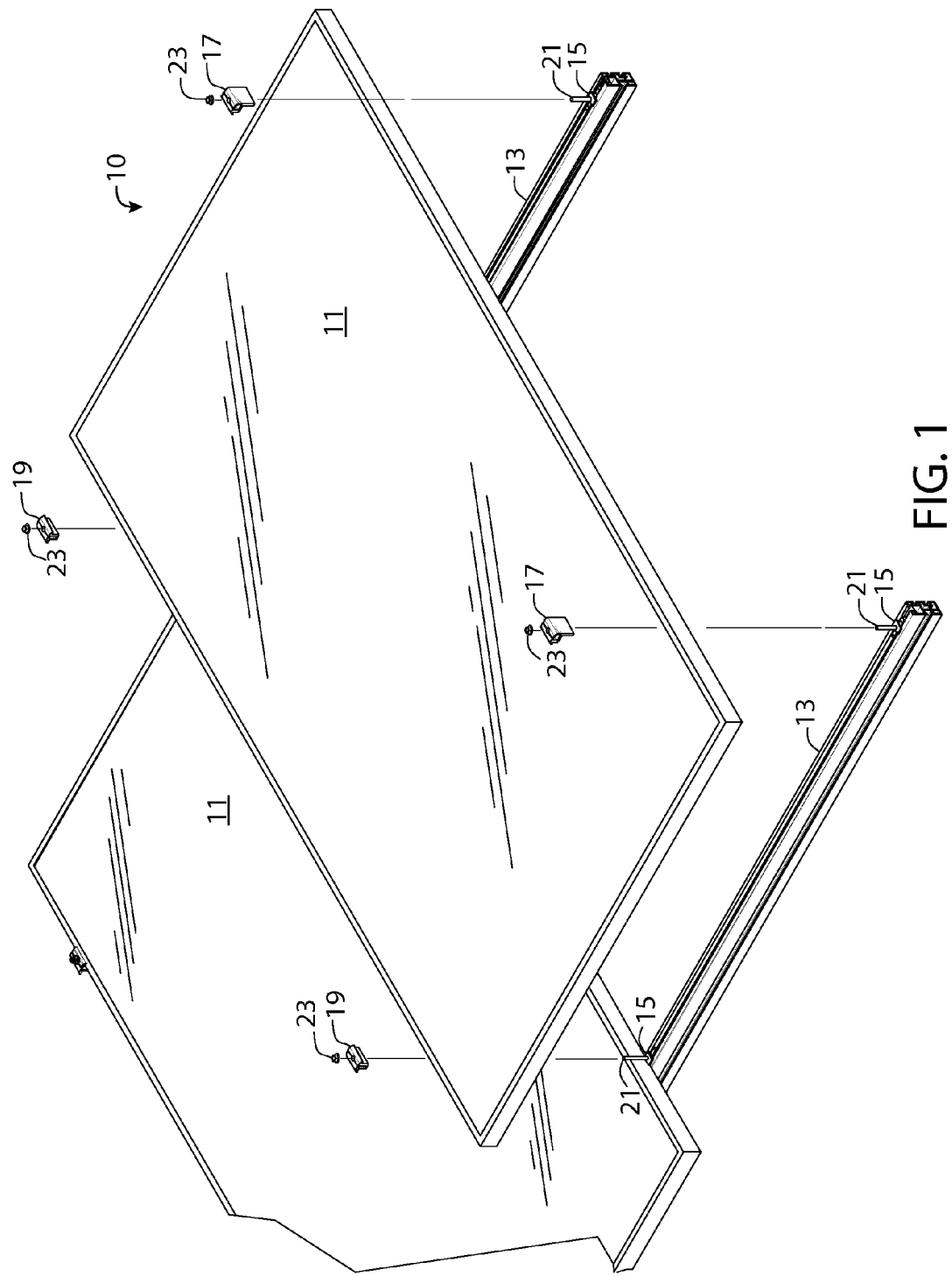
FIG. 1 shows solar panels, a rail, and a device for mounting, aligning, and grounding the solar panels to the rail, in partially exploded perspective view.

The following description is made with reference to figures, where like numerals refer to like elements throughout the several views, FIG. 1 shows, in partially exploded perspective view, a solar panel racking system 10 including solar panels 11, rails 13, and a mounting device 15 for mounting, aligning, and grounding the solar panels 11 to the rails 13. The mounting devices 15 are shown in a configuration where they are captive within the rail. The solar panels 11 illustrated are solar photovoltaic (PV) panels. These can alternatively be solar thermal panels. Also illustrated are solar panel end-clamps 17 and solar panel mid-clamps 19. The solar panel end-clamps 17 and solar panel mid-clamps 19 are secured to the mounting devices 15 and rails 13 by a combination of t-bolts 21 and nuts 23.

Figure 2:
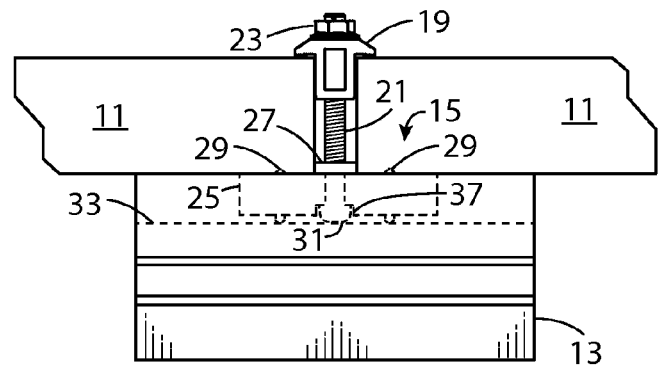
FIG. 2 shows a front view of a portion of the solar panels mounted, aligned, secured, and grounded to the rail with the mounting device with a mid-clamp.
Figure 3:
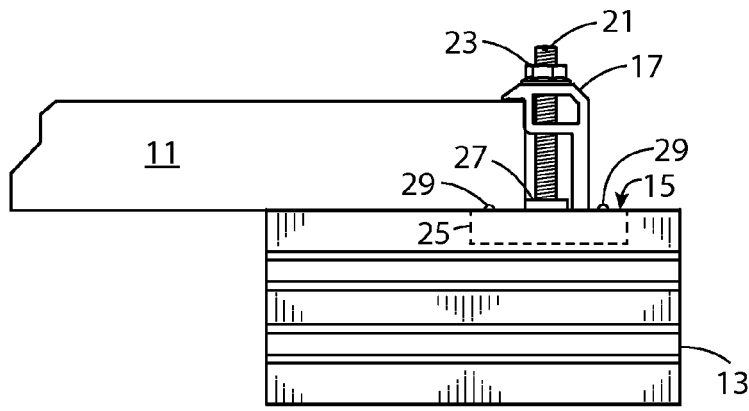
FIG. 3 shows a front view of an end portion of one of the solar panels mounted, aligned, secured, and grounded to the rail and to each other, with the mounting device with an end-clamp.
Figure 4:
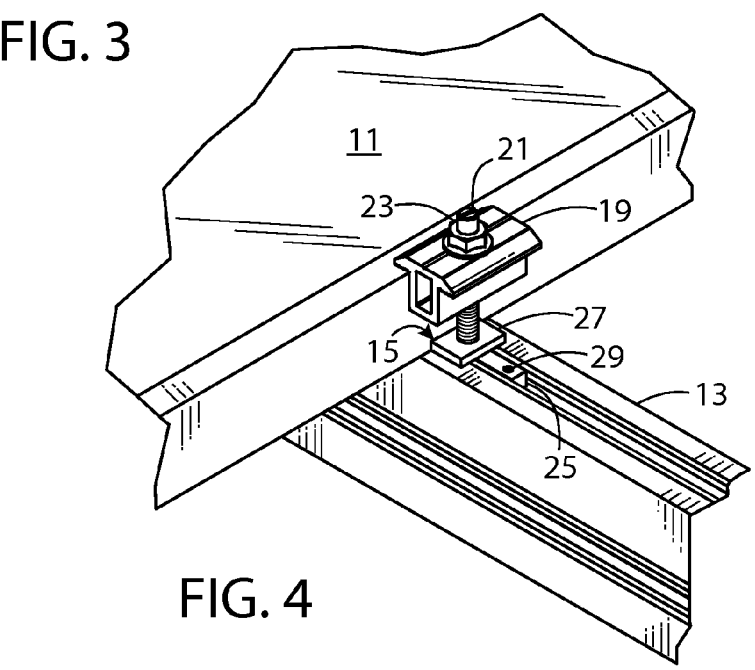
FIG. 4 shows a portion of a solar panel mounted, aligned, secured, and grounded to the rail and to each other, with the mounting device and a mid-clamp in perspective view. The second solar panel removed for clarity.

FIGS. 2-4 show portions of the metal frame of the solar panels 11 of FIG. 1 mounted, aligned, secured, and grounded to the rail 13. FIG. 2 shows a front view of a portion of the metal frames of two of the solar panels 11 mounted, aligned, secured, and grounded to the rail 13 with the mounting device 15 and a solar panel mid-clamp 19. FIG. 3 shows a front view of an end portion of the metal frame of one of the solar panels 11 mounted, aligned, secured, and grounded to the rail 13 with the mounting device 15 and the solar panel end-clamp 17. FIG. 4 shows, in perspective view, a portion of a solar panel 11 mounted, aligned, secured, and grounded to the rail 13 with the mounting device 15 and the solar panel mid-clamp 19. In FIGS. 2-3, a base portion 25 of the mounting device 15 is shown in hidden within the rail 13. This is represented by broken lines. The top surface of the base portion 25 is approximately level or in the same plane as the top of the rail to present a level or even surface to the bottom of the solar panel 11. Alternatively, the top surface of the base portion 25 can be below the level or plane of the top of the rail 13. The rail 13 would then present a stable mounting surface on either side of the base portion 25.

In FIGS. 2 and 4, the solar panel 11 is secured and mounted to rail 13 and the base portion 25 of the mounting device 15 by securing the solar panel mid-clamp 19 by the t-bolt 21 and the nut 23. In FIG. 3, the solar panel 11 is secured and mounted to rail 13 and the base portion 25 of the mounting device 15 by securing the solar panel end-clamp 17 by the t-bolt 21 and the nut 23. In FIGS. 2-4, the solar panels 11 are aligned perpendicular to the rails 13 by an alignment portion 27 of the mounting device 15. The alignment portion 27 shown is a rectangular block projecting perpendicularly upward from base portion. In FIG. 4, the alignment portion also has two parallel opposing sides that are aligned perpendicular to the length of the base portion 25. This in turn, causes the two parallel opposing sides to be aligned perpendicular to the length of the rail 13. When the solar panels 11 are lined up against the two opposing sides of the alignment portion 27 that are perpendicular to the base portion 25, the solar panels are automatically aligned perpendicularly to the length of the rail 13.

In FIGS. 2-4, the metal frames of solar panels 11 are electrically connected to each other and grounded to the rails 13 by grounding pins 29 in the top of the base portion 25 of the mounting device 15. The grounding pins 29 under the frame of the solar panels 11 in FIGS. 2-3 are hidden from view, but shown for illustrative purposes. The frames of the solar panel 11 and the rails 13 are typically made of aluminum, but other metals can be used. Aluminum typically is anodized and forms a non-conductive oxide coating. The grounding pins 29 typically have a sharp top or pointed top surface the pierces the oxide coating of the aluminum, when the panel is tightened down by the nut 23 and either solar panel end-clamp 17 or solar panel mid-clamp 19 in order to complete the electrical connection. The top surface of the base portion 25 height is such that, when the base portion 25 is tightened down by the nut 23, the grounding pins 29 protrude with sufficient height to make electrical conductive contact with the metal frame of the solar panels 11.

In FIG. 2, the base portion 25 and a t-bolt head 31 are shown mounted inside a rail slot 33, all in hidden lines represented by broken or dashed lines. The base portion 25 includes a base portion slot 37 that is runs transverse to the length of the base portion 25 and is shown transverse to the rail 13. The t-bolt head 31 is shown resting in the base portion slot 37. The bottom of the grounding pins 29, also shown in hidden lines, and are shown engaged with the bottom of the rail slot 33. The t-bolt head 31 is so positioned in the base portion slot 37 and the bottom of the grounding pins 29 so positioned in relation to the base portion 25, so that there is sufficient tension between the grounding pins 29 and rail 13 for the grounding pins 29 to penetrate the oxide layer of the rail 13 when the nut 23 is tightened so that the solar panel mid-clamp 19 engages the solar panel 11 against the base portion 25.

Figure 5:
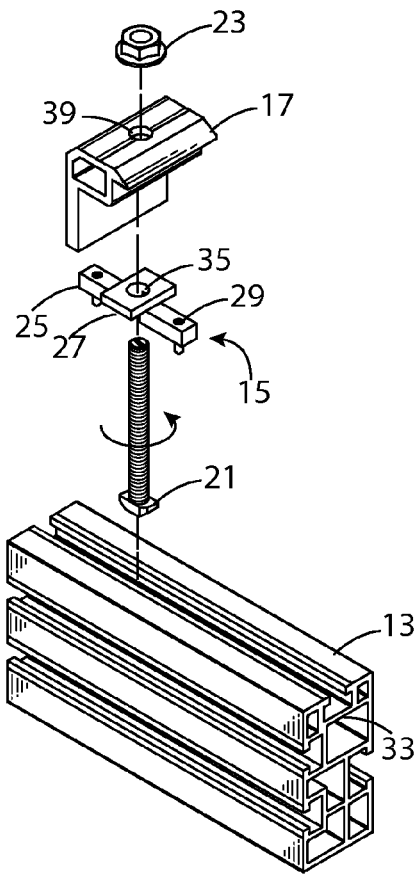
FIG. 5 shows, in exploded back perspective view, the mounting device with the solar panel end-clamp, and t-bolt, and nut.
Figure 6:
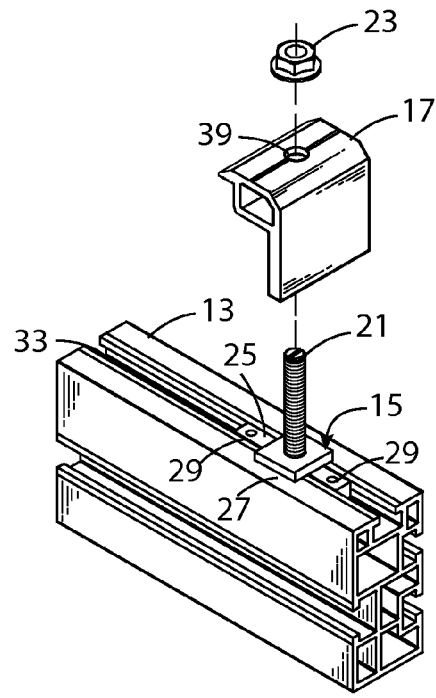
FIG. 6 shows, in exploded front perspective view, the mounting device with the solar panel end-clamp, t-bolt, and nut.
Figure 7:
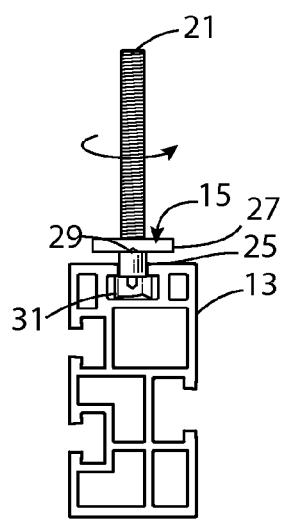
FIG. 7 shows, in side-view, the t-bolt, and mounting device mounted into the rail slot but not secured.
Figure 8:
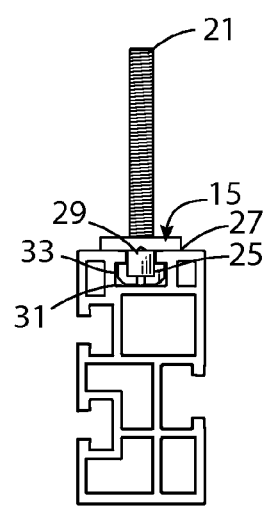
FIG. 8 shows the t-bolt, and mounting device secured to the rail slot.

FIGS. 5-8 shows, in several views, detail of how the mounting device 15 is secured to the rail 13. FIG. 5 shows, in exploded back perspective view, the mounting device 15 with the solar panel end-clamp 17, and t-bolt 21, and nut 23. FIG. 6 shows, in exploded front perspective view, the mounting device 15 with the solar panel end-clamp 17, t-bolt 21, and nut 23. In FIG. 7, the t-bolt 21 and mounting device 15 are mounted into the rail 13 but not secured. FIG. 8 shows the t-bolt 21 and mounting device 15 secured to the rail 13. In FIGS. 5 and 7, the t-bolt head is positioned lengthwise with respect to the rail. In FIG. 7, the t-bolt is inserted 21 into the rail 13. In this position, the alignment portion 27 and the base portion 25 are shown above the rail 13 surface; the t-bolt head 31 is free to move either vertically or horizontally. The bottom of the grounding pins 29 are suspended above the bottom of the rail slots 33. Rotating the t-bolt 21, approximately 90-degrees either clockwise or counterclockwise as indicated by the rotational arrow in FIGS. 5 and 7 will lock the mounting device 15 into a rail slot 33 and secure the t-bolt 21 in an upright position. FIGS. 6 and 8 shows the t-bolt head 31 rotated approximately 90-degrees from its position in FIGS. 5 and 7, so that it is vertically captive within the rail slot 33. The base portion 25 of the mounting device 15 is fully within the rail slot 33 and the alignment portion is resting securely against the top of the rail 13. The top of the base portion 25 is approximately level with the top of the rail 13 and the alignment portion 27, resting on the top of the rail 13. The alignment portion 27 is shown having two sides parallel and two sides perpendicular to the length of the rail 13. The grounding pins 29 are engaged with the bottom of the rail slot with sufficient force or pressure to penetrate the oxide layer of the rail slot 33 to make an electrically conductive connection.

Figure 9:
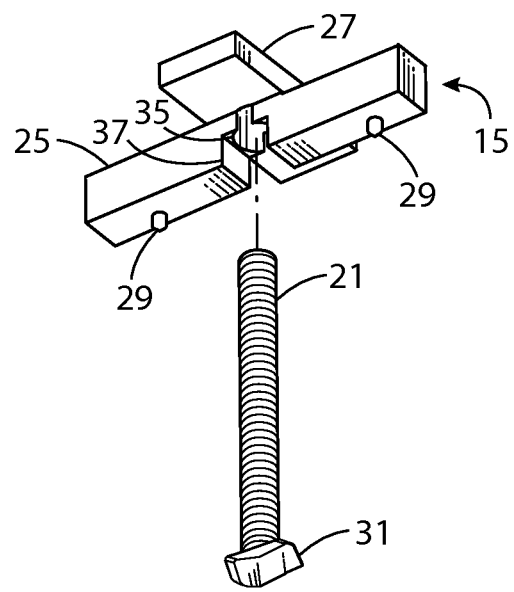
FIG. 9 shows an exploded bottom perspective view of the base portion and the t-bolt where the t-bolt is aligned for insertion into the rail slot.
Figure 10:
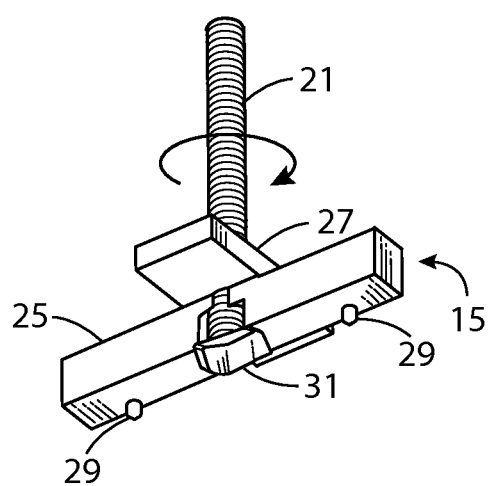
FIG. 10 shows a bottom perspective view of the t-bolt inserted into the mounting device where the t-bolt is aligned, as in FIG. 9, for insertion into the rail slot.

FIGS. 9-11 further illustrates how the t-bolt is locked into place within the mounting device 15. In addition, FIGS. 9-11 show the grounding pins 29 mounted through the bottom of the base portion 25. FIG. 9 shows an exploded bottom perspective view of the mounting device 15 and the t-bolt 21 where the t-bolt is aligned for insertion into the rail slot. FIG. 10 shows a bottom perspective view of the t-bolt 21 inserted into the mounting device 15 where the t-bolt 21 is aligned, as in FIG. 9, for insertion into the rail slot 33. FIG. 11 shows a bottom perspective view of the t-bolt 21 inserted into the mounting device 15 illustrated the relationship between the t-bolt 21 and the mounting device 15 when they are secured to the mounting rail.

In FIG. 9, the t-bolt 21 is inserted through an aperture 35 in the alignment portion 27. The aperture is sized to receive the t-bolt and typically not threaded so that the t-bolt 21 can freely move through the aperture 35. The base portion 25 includes the base portion slot 37 shown aligned transversely across the length of the base portion 25. The aperture 35 is aligned over the base portion slot 37. The base portion slot 37 is approximately as wide as the width of the t-bolt head 31. This arrangement provides for the length of the t-bolt head 31 can be held transverse to the length of the base portion 25 with little or no rotation movement rotational or vertical movement. While the base portion slot 37 is shown aligned perpendicularly across the length of the base portion 25, any transverse angle can be used between 45-degrees and 135-degrees which allows the t-bolt 21 sufficient holding strength to withstand the rotational forces of the solar panels and other components. A perpendicular or 90-degree angle provides for the t-bolt head 31 of shortest length.

In FIG. 10, the t-bolt 21 is shown inserted into the mounting device 15, so that the length of the t-bolt head 31 is aligned with the length of the base portion 25. This allows the t-bolt 21 and base portion 25 to be inserted into the rail slot 33 as shown in FIG. 5, resulting in the configuration of FIG. 7. In FIG. 10, the t-bolt head 31 cannot be inserted into the base portion slot 37 when positioned along the length of the base portion 25.

In FIG. 11, the t-bolt 21 is shown rotated approximately 90 degrees about its vertical axis, as depicted by the rotational arrow in FIG. 10. The t-bolt head 31 now is in the base portion slot 37. The mounting device 15 is now configured as shown in FIG. 8 with the bottom surface of the alignment portion 27 resting against the top surface of the rail 13. In FIGS. 8 and 10, the opposing ends along the length of the t-bolt head 31 extend beyond the width of the base portion 25. This causes the t-bolt head 31 to be held captive within the cavity of the rail slot 33 as shown in FIG. 8, and the base portion slot 37 prevents the t-bolt head 31 from rotating. This configuration creates a secure base for mounting the solar panel 11 and either solar panel end-clamp 17 or solar panel mid-clamp 19 of FIG. 1. In addition, this configuration allows the mounting device 15 and t-bolt 21, which can be held captive within the rail by simply rotating the t-bolt into the base portion slot 37 thereby locking the t-bolt in place. At the same time, allowing the mounting device 15 and t-bolt 21 to be inserted anywhere along the rail 13. This is in contrast to many other captive solar panel rail-mount devices that can be only inserted at the ends of the slots.

FIGS. 12-17 show the mounting device in several views. FIG. 12 shows an exploded perspective view of the mounting device 15 and the grounding pins 29. FIG. 13 shows an exploded perspective view of the mounting device 15 with the grounding pins 29 secured in the base portion 25. FIG. 14 shows a top view of the mounting device 15. FIG. 15 shows a sectional view of the mounting device of FIG. 14 taken along section lines 15-15. FIG. 16 is a side view of the mounting device 15. FIG. 17 is a bottom view of the mounting device 15.

In FIG. 12, the grounding pins 29 can be inserted through apertures 39 on the top surface of the base portion 25 so that the bottom of the grounding pin 29 is positioned below the bottom of the base portion 25 so that the tip of the bottom of the grounding pins 29 can exert sufficient force to break the oxide layer of the rail 13 when the t-bolt head 31 is inserted into the rail slot 33 and tightened down with the nut 23 as described for FIGS. The top of the grounding pins 29 rest slightly above the top surface of the base portion 25 so that the tip of the grounding pins 29 can penetrate the oxide layer of the solar panel frames but are also mounted sufficiently close to the top surface of the base portion 25 so that the solar panel frames can seat flush against the top surface of the rail 13. In FIGS. 13-17, the grounding pins 29 are shown mounted to the base portion 25 in various views.

In FIGS. 12-13, the alignment portion 27 is shown projecting upward from the base portion 25. The base portion 25 and alignment portion 27 are both illustrated as rectangular cuboids where the lengths of each of the rectangular cuboids are at right angles to each other. The base portion 25 and the alignment portion 27 can be cast, stamped, milled, or otherwise integrally formed from a single piece of metal. Alternatively the base portion 25 and the alignment portion can be cast, formed, stamped, extruded, or milled from two separate pieces of metal and then rigidly joined together as a joined integral unit. For example, the base portion 25 and alignment portion can be joined by welding. While both the base portion 25 and the alignment portion 27 are illustrated as rectangular cuboids, the base portion 25 can be other shapes, for example, a truncated pyramid. The base portion 25 can be shaped so that its top surface is planar to the top surface of the rail, the top surface including a pair of opposing sides parallel to the length of the rail slot 33, the depth of the base portion 25 is no deeper than the depth of the rail slot 33 and its width is no wider than the width of the rail slot 33. The alignment portion 27 can be shaped so that the top and bottom surfaces are parallel and planar with the top surface of the base portion 25 and the top of the rail 13. The length of the alignment portion 27 along the rail slot 33 is narrower than the length of the base portion 25. The width of the alignment portion 27 is wider than the width of the base portion 25 so that a portion of the alignment portion 27 extends beyond the rail slot 33 and over laps the rail 13 on each side of the rail slot 33. Two of the opposing sides are parallel to each and project perpendicularly upward from the top surface of the top of the base portion 25.

In FIG. 14, the aperture 35 in the alignment portion 27 is shown centered in the alignment portion 27 and centered over the base portion 25. The grounding pins 29 are shown on the top surface of the base portion 25. FIG. 14 illustrates the base portion 25 and the alignment portion 27 having a rectangular shaped top surface where the respective lengths of the base portion 25 and alignment portion 27 are perpendicular to each other. While shown as having rectangular shaped top surfaces, the base portion 25 and alignment portion can each have a trapezoid shape. The parallel sides of the base portion run along its length. The parallel sides of the alignment portion 27 run along its width and are perpendicular to the parallel sides of the base portion 25.

In FIG. 15 the grounding pins 29, aperture 35 in the alignment portion 27, the base portion slot 37 as well as the slot support base 41 are shown in cross-sectional relation with the base portion 25 and the alignment portion 27. In FIG. 16, the grounding pins 29, the aperture 35, the base portion slot 37, and the slot support base 41 are shown in relation with the base portion 25 and the alignment portion 27 in side-view. Referring to FIGS. 8, and 15-16, the slot support base of FIGS. 15-16 in combination with the base portion 25 is of a depth where when combined with the t-bolt of FIG. 8, holds the bottom of the t-bolt at a distance at or above the bottom of the rail slot 33 so that the t-bolt cannot rotate out of the rail slot 33.

In FIG. 17, the aperture 35 in the alignment portion 27, the alignment portion 27, and the base portion 25 are shown in relationship to each other in bottom view. Here the slot support base 41 can be view from within the base portion slot 37 and surrounding the aperture 35.

As illustrated in FIGS. 1-4, the mounting device 15 disclosed in FIGS. 1-18 is configured to mount the solar panel 11 perpendicularly across the rails 13. Disclosed is a mounting device in FIGS. 18-41, where, as shown in FIG. 18, the outside edges 101 of the solar panels 11 can be mounted along the length of the rail 13. A combination of t-bolts 21 and nuts 23, solar panel end-clamps 17 and solar panel mid-clamps 19 secure the solar panel 11 to the mounting devices 115 and rails 13. Once the solar panel 11 is secured by the t-bolts 21, nuts 23, and solar panel mid-clamps 19, the mounting devices 115 become captive within the rail 13.

FIG. 19 shows, in exploded perspective view, the mounting device 115 with the solar panel end-clamp 17, t-bolt 21, nut 23, and rail 13. The t-bolt includes a t-bolt head 103 and a t-bolt body 105. The t-bolt head 103 includes a t-bolt planar bottom surface 107, shown as facing upward in the figure. The t-bolt body 105 projects outward perpendicularly away from the t-bolt planar bottom surface 107. The length of the t-bolt head 103 is shown oriented along the length of the rail slot 33. The width of the t-bolt head 103 is narrow than the rail slot 33 opening so in the position illustrated, the t-bolt head 103 can be inserted into the rail slot 33 opening. The length of the t-bolt head 103 is wider than the rail slot 33 opening but narrower than the rail slot cavity 109. This configuration allows the t-bolt head 103 to be inserted or removed from the rail slot 33, than rotated to be held captive in the rail slot 33.

FIG. 20 shows, in partially exploded perspective view, the mounting device 115 and t-bolt 21 seated in the rail 13, with the solar panel end-clamp 17 and nut 23 exploded away from the mounting device 115 and rail 13 assembly for clarity. FIG. 21 shows, in partially exploded perspective view, the mounting device 115 and t-bolt 21, seated in the rail 13 with a solar panel mid-clamp 19 and nut 23 exploded away from the mounting device 115 and rail 13 assembly.

Referring to FIGS. 19-21, the mounting device 115 includes a planar top surface 117, a first portion 119 projecting vertically upward directly from the planar top surface 117, a planar bottom surface 121, and a second portion 123 projecting vertically downward directly from the planar bottom surface 121. The first portion 119 and the second portion 123 are vertically aligned and centered over each other and are oriented along the same direction with the respect to the mounting device 115. The first portion 119 divides the planar top surface into two planar top sub-surfaces. The second portion 123 divides the planar bottom surface into two planar bottom sub-surfaces. Grounding pins 29 project through the planar top surface 117 and the planar bottom surface 121 on each side of the first portion 119 and the second portion 123. Referring to FIG. 19, the grounding pins 29 are shown aligned over the top surface of the rail 13. An aperture 35, shown in FIG. 19, passes through both the first portion 119 and the second portion 123 and is sized to pass the t-bolt body 105. An aperture 135 in solar panel end-clamp 17 or the solar panel mid-clamp 19 is sized to receive the t-bolt body 105.

The solar panel end-clamp 17 in FIGS. 19-20, and the solar panel mid-clamp 19 in FIG. 21 are oriented along the same direction as the length of the rail 13 the first portion 119, and the second portion 123. As illustrated in FIG. 22 and FIG. 23, this structure aligns the solar panels 11 along the length of the rail 13. In FIG. 22 a first portion vertical edge 125 and a solar panel end-clamp vertical edge 127 are co-planar by virtue of the t-bolt body 105 passing through both the aperture 135 in the solar panel end-clamp 17 and the aperture 35 in the mounting device 115. The outside edge 101 of the solar panel 11 aligns against both the first portion vertical edge 125 and the solar panel end-clamp vertical edge 127. Similarly, in FIG. 23, a first portion vertical edge 125 and a solar panel mid-clamp vertical edge 129 are co-planar by virtue of, the t-bolt body 105 passing through both the aperture 135 in the solar panel mid-clamp 19 and the aperture 35 in the mounting device 115. The outside edge 101 of the solar panel 11 aligns against both the first portion vertical edge 125 and the solar panel mid-clamp vertical edge 129.

In FIG. 23, the mounting device 115, the t-bolt 21, rail 13, solar panel 11, and the solar panel mid-clamp 19 are shown in a position where the planar bottom surface 121 of the mounting device 115 rests flush against the top surface of the rail 13. The t-bolt 21 is rotated so that the length of the t-bolt head 103 is pulled into a slot in second portion 123 and the t-bolt planar bottom surface 107 is engaged flushly against the top inside surface of the rail slot cavity 109. The nut 23 is tightened so that the solar panel is secured between the solar panel mid-clamp 19 and the planar top surface 117 of mounting device 115. The outside edge 101 of the solar panel 11 is shown engaged flushly against both solar panel mid-clamp vertical edge 129 and the first portion vertical edge 125. The grounding pins 29 float in an aperture 131 and engage both the bottom frame of the solar panel 11 and the top surface of the rail 13. This arrangement is virtue of the structure of the grounding pin, the structure of the grounding pin was disclosed by the applicant in U.S. patent application Ser. No. 14/054,759 filed on Oct. 15, 2013, the entire contents of which are hereby incorporated by reference, and will be further described in an ensuing paragraph.

In FIG. 22, the mounting device 115, the t-bolt 21, rail 13, solar panel 11 and the solar panel end-clamp 17 are shown in a position where the planar bottom surface 121 of the mounting device 115 rests flush against the top surface of the rail 13. The t-bolt 21 is rotated so that the length of the t-bolt head 103 is pulled into a slot in second portion 123 and the t-bolt planar bottom surface 107 is engaged flushly against the top inside surface of the rail slot cavity 109. The nut 23 is tightened so that the solar panel is secured between the solar panel end-clamp 17 and the planar top surface 117 of mounting device 115. The outside edge 101 of the solar panel 11 is shown engaged flushly against both the solar panel end-clamp vertical edge 127 and the first portion vertical edge 125. The grounding pins 29 float in an aperture 131. One of the grounding pins 29 engages both the bottom frame of the solar panel 11 and the top surface of the rail 13. The other of the grounding pins 29 shown engages both the bottom surface of the solar panel end-clamp 17.

FIG. 24 shows, in side view, a first step in the assembly sequence of securing the mounting device 115 and t-bolt 21 to the rail 13. FIG. 25 shows, in side view, a second step in the assembly sequence of securing the mounting device 115 and t-bolt 21 to the rail 13. FIG. 26 shows, in side view, a third step in the assembly sequence of securing the mounting device 115 and t-bolt 21 to the rail 13. Referring to FIG. 24, the rail slot 33 bisects the top inside surface 133 of the rail slot cavity 109 forming a longitudinal slot along the rail with an inside cavity wider than the slot opening on along the top surface of the rail 13. The t-bolt 21 is rotated so the width of the t-bolt head 103 is oriented with the width of the rail slot 33 opening, allowing the t-bolt head 103 to fit into the rail slot 33 from the top.

In FIG. 25, the t-bolt body 105 is inserted through the aperture 35 of the mounting device 115. The second portion 123 of the mounting device 115 engages the rail slot 33. The t-bolt head 103 rests against outside bottom surface of the second portion 123 and against the rail slot cavity 109 bottom surface. In this position, the planar bottom surface 121 of the mounting device 115 does not engage the rail 13 top surface.

In FIG. 26 the t-bolt is rotated so that it engages a slot in the second portion 123. The slot 137 is illustrated in FIGS. 27-29, which show bottom perspective of the t-bolt 21 and the mounting device 115. FIG. 27 corresponds to the relationship between the t-bolt 21 and the mounting device 115 in FIG. 24. FIG. 28 corresponds to the relationship between the t-bolt 21 and the mounting device 115 of FIG. 25, and FIG. 29 shows the relationship between the t-bolt 21 and the mounting device 115 of FIG. 26. In FIG. 28, the t-bolt 21 is oriented along the length of the second portion 123. The t-bolt does not engage the slot 137 because the length of the t-bolt head 103 is wider than the slot 137. In FIG. 29, the t-bolt 21 is engaged in the slot 137. The t-bolt head 103 is oriented transverse to the length of the second portion 123 and parallel to the slot 137 opening. The width of the t-bolt head 103 is smaller than the slot 137 opening, allowing the t-bolt 21 to fully engage the slot 137. The length of the t-bolt head 103 is wider than the second portion 123. As a consequence, the t-bolt head 103 extends beyond the width of the second portion 123. The slot 137 of FIG. 29 is of sufficient depth to allow the planar bottom surface 121 of the mounting device 115 to engage flush against the top surface of the rail 13 as illustrated in FIG. 26. In FIG. 26, the second portion 123 height must be less than the combination of the depth of the rail slot 33 of FIG. 24 and the depth of the rail slot cavity 109 in order for the planar bottom surface 121 of the mounting device 115 to engage flush against the top surface of the rail 13. In FIG. 26 the t-bolt head 103 is resting against the bottom surface of the rail slot cavity 109. However when the nut 23 and t-bolt 21 of FIGS. 22-23, engages and secures the solar panel using either the solar panel end-clamp 17, as in FIG. 22, or the solar panel mid-clamp 19, as in FIG. 23, the t-bolt 21 is pulled upward until the t-bolt planar bottom surface 107 is flush against the surface of the slot 137 and flush against the top inside surface of the rail slot cavity 109. It is important to note that in FIGS. 20-23, and 26, the t-bolt 21 cannot rotate (i.e. is rotational locked). This allows for easy mounting of the solar panel end-clamp 17 or solar panel mid-clamp 19 and nut 23.

FIG. 30 shows a top perspective view of the mounting device 115 with the grounding pins 29 exploded away from their respective apertures 131. FIG. 31 shows a side view of the mounting device 115. FIG. 32 shows a top view of the mounting device 115. FIG. 33 shows a bottom view of the mounting device 115. FIGS. 30-32 illustrate the aperture 35 in relation to the first portion 119, the first portion 119 projecting vertically upward out of the planar top surface 117, the grounding pins 29 in relation to in relationship to both the planar top surface 117 and the first portion 119. FIGS. 30-31 illustrate the grounding pins 29 in relationship to the apertures 131. FIGS. 30, 31, and 33 illustrate the planar bottom surface 121 in relation to the second portion 123, and the aperture 35 in relation to the second portion 123. FIG. 33 illustrates the slot 137 in relation to the aperture 35, and the second portion 123. FIG. 33 illustrates the grounding pins 29 in the planar bottom surface 121 on opposite sides the second portion 123. FIGS. 30, 31, and 33 illustrate a flanged portion 139 of the mounting device 115. This flanged portion 139 provides the planar top surface 117 with a wider mounting base for the solar panel 11 as illustrated in FIGS. 22-23.

The grounding pins 29 illustrated in FIG. 30 have sharpened top and bottom edges and a slit down their substantially cylindrical body. The pins are typically made of a hard conductive metal such as steel. The diameter of the pin is slightly larger than the apertures 131 that receive the grounding pins 29. When the grounding pins 29 are inserted into the apertures 131, they compress by virtue of slit and are held tightly in the hole. However, a downward pressure, for example from a solar panel frame, or an upward pressure, for example from top of the rail, will cause the grounding pin 29 to move. As the solar panel assembly is mechanically secured to the rail, the grounding pins 29 will self-align in the aperture 131 with the sharpened edges penetrating a non-conductive oxide layer on both the solar panel frame and the top of the rail which will create an electrical connection.

Solar panels come in different heights and can require careful planning to match mounting equipment with specific models of solar panels. In addition, it is unpredictable what panel heights will be available in the future, creating maintenance challenges. FIGS. 34-43 attempt to address this issue by introducing a hollow bolt 141 with reverse interior threading. This allows a single sized t-bolt to accommodate a variety of different solar panel heights. FIG. 34 shows the solar panel 11 secured to the rail 13 by the mounting device 115, solar panel mid-clamp 19, t-bolt 21, and a hollow bolt 141. The hollow bolt 141 in combination with the t-bolt 21 create a telescoping arrangement between the solar panel mid-clamp 19 and the mounting device 115 in order to accommodate different solar panel heights or thicknesses.

FIG. 35 shows, in exploded perspective view, the mounting device 115 with the solar panel mid-clamp 19, t-bolt 21, hollow bolt 141, and rail 13. The length of the t-bolt head 103 is shown oriented along the length of the rail slot 33. The width of the t-bolt head 103 is narrow than the rail slot 33 opening so in the position illustrated, the t-bolt head 103 can be inserted into the rail slot 33 opening. The length of the t-bolt head 103 is wider than the rail slot 33 opening but narrower than the rail slot cavity 109. This configuration allows the t-bolt head 103 to be inserted or removed from the rail slot 33, than rotated to be held captive in the rail slot 33.

FIG. 36 shows, in partially exploded perspective view, the mounting device 115 and t-bolt 21 seated in the rail 13, with the solar panel mid-clamp 19 and hollow bolt 141 exploded away from the mounting device 115 and rail 13 assembly for clarity. FIG. 37 shows, in partially exploded perspective view, the mounting device 115 and t-bolt 21, seated in the rail 13 with a solar panel end-clamp 143 and hollow bolt 141 exploded away from the mounting device 115 and rail 13 assembly.

In FIGS. 35-37, the mounting device 115 is illustrated as previously described in FIGS. 19-21 and 27-33. The solar panel mid-clamp 19 of FIGS. 35-36 and the solar panel end-clamp 143 of FIG. 37, each include an aperture 135 sized pass through the hollow bolt body 145, but not the hollow bolt head 147. The solar panel end-clamp 143, in FIG. 37 includes a u-shaped mounting base 149. The solar panel end-clamp 143 with the u-shaped mounting base 149 provides a wide base with increased stability.

FIG. 38 shows, in side view, the mounting device 115, the solar panels 11, the solar panel mid-clamp 19, the hollow bolt secured 141, and the t-bolt 21 mounted to the rail 13. FIG. 39 shows, in side view, the mounting device 115, solar panel 11, solar panel end-clamp 143, the hollow bolt 141 secured to the rail 13. In FIGS. 38-39, the hollow bolt body 145 includes a threaded hollow interior portion 153 sized and threaded to receive the t-bolt body 105. In FIGS. 36-39, the t-bolt 21 cannot rotate (i.e. is rotational locked). This feature allows for easy mounting of the solar panel end-clamp 143 of FIG. 39 or solar panel mid-clamp 19 of FIG. 38 to the t-bolt 21 and hollow bolt body 145. In FIG. 39, the solar panel facing vertical edge 155 of the u-shaped mounting base 149 is positioned with respect to the aperture 135 to align flush against the first portion second vertical edge 157 when the t-bolt body 105 and the threaded hollow interior portion 153 of the hollow bolt 141 are engaged to secure the mounting device 115 and solar panel end-clamp 143 to the solar panel 11. In addition, the first portion vertical edge 125 and a solar panel end-clamp vertical edge 127 are co-planar by virtue of the t-bolt body 105 passing through both the aperture 135 in the solar panel end-clamp 143 and the aperture 35 in the mounting device 115. The outside edge 101 of the solar panel 11 aligns against both the first portion vertical edge 125 and the solar panel end-clamp vertical edge 127.

FIGS. 40-43 illustrate the hollow bolt 141 in various views. FIGS. 40-41 illustrate the hollow bolt body 145 and the hollow bolt head 147. FIG. 43 illustrates only the hollow bolt head 147. FIG. 40 shows a top perspective view of the hollow bolt 141. FIG. 41 shows a side view of the hollow bolt 141. FIG. 42 shows a sectional view of the hollow bolt 141 taken along section lines 42-42 in FIG. 41. FIG. 43 shows a top view of the hollow bolt. In FIGS. 40-42 show the hollow bolt head 147 with a flanged circular portion 151 that can replace the functionality of a washer. In FIG. 42, the hollow bolt body 145 includes the threaded hollow interior portion 153. The threaded interior's width and threading is sized to engage the threading of the t-bolt 21 of previous figures. The threaded interior 153 is reverse threaded so that when the t-bolt 21, of the previous figures, engages the hollow bolt 141, the hollow bolt 141 will tighten in the normal direction, i.e. by turning clockwise. The length of the hollow bolt body 145 and t-bolt body 105 can sized to accommodate a wide range of solar panel thicknesses. While the hollow bolt head 147 is shown in FIGS. 40-43 as a hex head bolt, it can be any standard bolt head or screw head with a flat bottom surface, for example, button head, socket cap (Allen), slotted hex, square (Robertson), torx, cross (Phillips), or slot.

In FIGS. 18-39, the mounting device 115 is typically made from a rigid electrically conductive material such as steel or aluminum. The shape of the mounting device 115 including the first portion 119, the second portion 123, and the flanged portion 139 can be fabricated from a single piece of material. For example, the mounting device 115 can made cut from an aluminum extrusion. It can also be cast or forged out of steel. Alternatively it can be made from separate portions of aluminum, steel, or other metal, and joined together by welding, riveting, or otherwise rigidly joining.

A device for mounting, aligning and grounding solar panels to roof mounted rails has been described. It is not the intent of this disclosure to limit the claimed invention to the examples, variations, and exemplary embodiments described in the specification. Those skilled in the art will recognize that variations will occur when embodying the claimed invention in specific implementations and environments. It is possible to implement certain features described in separate embodiments in combination within a single embodiment. Similarly, it is possible to implement certain features described in single embodiments either separately or in combination in multiple embodiments. For example, FIGS. 5-6 illustrated the mounting device 15, t-bolt 21, and nut 23 combined with a solar panel end-clamp 17, a solar panel mid-clamp can also be used, as illustrated in FIG. 1. The hollow bolt 141 of FIGS. 34-43 can also be used for the mounting device 15 of FIGS. 1-17. It is the intent of the inventor that these variations fall within the scope of the claimed invention. While the examples, exemplary embodiments, and variations are helpful to those skilled in the art in understanding the claimed invention, it should be understood that, the scope of the claimed invention is defined solely by the following claims and their equivalents.

What is claimed is:

1. An apparatus for mounting solar panels to rails, including:
   a t-bolt including a t-bolt body, and a t-bolt head, and the t-bolt head includes a t-bolt head planar bottom surface with the t-bolt body projecting perpendicularly therefrom;
   a mounting device including a planar top surface, a planar bottom surface, a first portion with first portion parallel sides projecting vertically upward out of the planar top surface, a second portion with second portion parallel sides projecting vertically downward out of the planar bottom surface and aligned over and along the first portion parallel sides, an aperture passing through the first portion and the second portion, and a slot in the second portion cutting transversely across and through the second portion parallel sides and aligned over the aperture;
   the t-bolt, and the mounting device configurable into a first position where the t-bolt body passes through the aperture, the t-bolt head planar bottom surface engages flushly against the slot, and the t-bolt is rotationally captive within the slot;
   the planar top surface is divided by the first portion into a first top surface portion and a second top surface portion;
   a first grounding pin and a second grounding pin;
   the first grounding pin projecting through the first top surface portion and the planar bottom surface; and
   the second grounding pin projecting through the second top surface portion and the planar bottom surface.

2. An apparatus for mounting solar panels to rails, including:
   a t-bolt including a t-bolt body, and a t-bolt head, and the t-bolt head includes a t-bolt head planar bottom surface with the t-bolt body projecting perpendicularly therefrom;
   a mounting device including a planar top surface, a planar bottom surface, a first portion with first portion parallel sides projecting vertically upward out of the planar top surface, a second portion with second portion parallel sides projecting vertically downward out of the planar bottom surface and aligned over and along the first portion parallel sides, an aperture passing through the first portion and the second portion, and a slot in the second portion cutting transversely across and through the second portion parallel sides and aligned over the aperture;
   the t-bolt, and the mounting device configurable into a first position where the t-bolt body passes through the aperture, the t-bolt head planar bottom surface engages flushly against the slot, and the t-bolt is rotationally captive within the slot;
   a hollow bolt including a bolt head, a hollow bolt body with a hollow interior sized and threaded to receive the t-bolt body; and
   a solar panel clamp including a clamp aperture sized to receive the hollow bolt body and seat the bolt head on the solar panel clamp.

3. An apparatus for mounting solar panels, including:
   a t-bolt including a t-bolt body, and a t-bolt head, the t-bolt head including a t-bolt head planar bottom surface with the t-bolt body projecting perpendicularly therefrom;
   a rail including a rail top surface, a rail slot running longitudinally along the rail top surface, and a rail slot cavity below the rail slot and integral to and wider than the rail slot;
   a mounting device including a planar top surface, a planar bottom surface, a first portion with first portion parallel sides projecting vertically upward out of the planar top surface, a second portion with second portion parallel sides projecting vertically downward out of the planar bottom surface and aligned under and along the first portion parallel sides, a second portion slot oriented transversely across and through the second portion parallel sides, and an aperture through the second portion slot and the first portion, and the aperture sized to receive the t-bolt body; and
   the t-bolt, the mounting device, and the rail configurable into a first position where: the t-bolt is received by the aperture and vertically and rotational captive within the second portion slot, the t-bolt head planar bottom surface engages flush against the rail slot cavity, the second portion fully within the rail slot and the rail slot cavity, and the planar bottom surface of the mounting device engages flush against the rail.

4. The apparatus of claim 3, further including:
   the planar top surface is divided by the first portion into a first top surface portion and a second top surface portion;
   a first grounding pin and a second grounding pin;
   the first grounding pin projecting through the first top surface portion and the planar bottom surface; and
   the second grounding pin projecting through the second top surface portion and the planar bottom surface.

5. The apparatus of claim 3, further including:
   a hollow bolt including a bolt head, a hollow bolt body with a hollow interior sized and threaded to receive the t-bolt body; and a solar panel clamp including a clamp aperture sized to receive the hollow bolt body and seat the bolt head on the solar panel clamp.

6. The apparatus of claim 3 further including:

a solar panel including a frame bottom surface and a frame vertical edge oriented along a length of the rail; and the frame bottom surface engages flushly against the rail and the planar top surface, and the frame vertical edge engages flushly against a side of the first portion parallel sides.

7. The apparatus of claim 6, further including:

a hollow bolt including a bolt head, a hollow bolt body with a hollow interior sized and threaded to receive the t-bolt body; and a solar panel clamp including a clamp aperture sized to receive the hollow bolt body and seat the bolt head on the solar panel clamp.

8. The apparatus of claim 6, further including:

a grounding pin projecting through the planar top surface and the planar bottom surface; and the grounding pin electrically and mechanically contacting the frame bottom surface and the rail slot cavity.

9. An apparatus for mounting solar panels to rails including:

a t-bolt including a t-bolt body, and a t-bolt head, the t-bolt head including a t-bolt head planar bottom surface with the t-bolt body projecting perpendicularly therefrom;

a rail including a rail top surface, a rail slot running longitudinally along the rail top surface, and a rail slot cavity below the rail slot and integral to and wider than the rail slot;

a solar panel including a solar panel frame;

a mounting device including a base portion fully within the rail slot and the rail slot cavity, a rigid alignment portion rigid joined to and projecting vertically upward from the base portion and resting on the rail top surface, a base portion slot in a base portion bottom surface and oriented transversely to a rail slot length, and an aperture positioned through the rigid alignment portion and the base portion slot; and the t-bolt, the mounting device, the solar panel, and the rail configurable into a first position where: the t-bolt is received by the aperture and vertically and rotational captive within the base portion slot, the t-bolt head planar bottom surface engages flush against the rail slot cavity, the bottom of the solar panel frame engages flushly against the rail and over the base portion, and an edge of the solar panel oriented transverse to a rail length engages flushly against the rigid alignment portion.

10. The apparatus of claim 9, further including:

a base portion top surface;

a grounding pin projecting through both the base portion top surface and the base portion bottom surface; and the grounding pin mechanically and electrically engaging the rail slot cavity and the solar panel frame.

* * * * *